(12) United States Patent
Iizuka et al.

(10) Patent No.: US 7,133,860 B2
(45) Date of Patent: Nov. 7, 2006

(54) DEVICE AND METHOD FOR AUTOMATICALLY CLASSIFYING DOCUMENTS USING VECTOR ANALYSIS

(75) Inventors: Yasuki Iizuka, Yokohama (JP); Yoshio Fukushige, Fujisawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 520 days.

(21) Appl. No.: 10/348,854

(22) Filed: Jan. 22, 2003

(65) Prior Publication Data

US 2003/0140033 A1 Jul. 24, 2003

(30) Foreign Application Priority Data

Jan. 23, 2002 (JP) .................. P 2002-013870

(51) Int. Cl.
G06F 17/30 (2006.01)
(52) U.S. Cl. .......................... 707/2; 382/224
(58) Field of Classification Search ................ 707/1–7, 707/101; 345/700; 715/511; 706/46–48
See application file for complete search history.

(56) References Cited

U.S. PATENT DOCUMENTS

| | | | |
|---|---|---|---|
| 6,032,146 A * | 2/2000 | Chadha et al. ................. 707/6 |
| 6,557,002 B1 * | 4/2003 | Yoshimatsu et al. ........ 707/102 |
| 6,584,220 B1 * | 6/2003 | Lantrip et al. .............. 382/154 |
| 6,721,729 B1 * | 4/2004 | Nguyen et al. ................. 707/3 |
| 2002/0022956 A1 * | 2/2002 | Ukrainczyk et al. ........... 704/9 |
| 2002/0065857 A1 * | 5/2002 | Michalewicz et al. ....... 707/532 |
| 2002/0159642 A1 * | 10/2002 | Whitney ..................... 382/225 |
| 2002/0163541 A1 * | 11/2002 | Williams .................... 345/764 |
| 2003/0140033 A1 * | 7/2003 | Iizuka et al. .................... 707/1 |

* cited by examiner

*Primary Examiner*—Debbie M. Le
(74) *Attorney, Agent, or Firm*—Pearne & Gordon LLP

(57) ABSTRACT

The present invention relates to a device for displaying a set of data in a space in a manner appropriate for the data while the data are being classified and arranged encounters a problem of requiring a large amount of computation and difficulty in observing results. In relation to a set of data to be expressed in the form of a matrix, a smaller volume of data pertaining to rows or columns are arranged in a space by means of a self-organizing method. The remaining data are arranged through use of only a result of arrangement. Classification and arrangement of data can be performed with a smaller amount of computation. Data pertaining to rows or columns can be utilized by displaying data pertaining to both rows and columns. Hence, a more understandable result can be obtained.

18 Claims, 19 Drawing Sheets

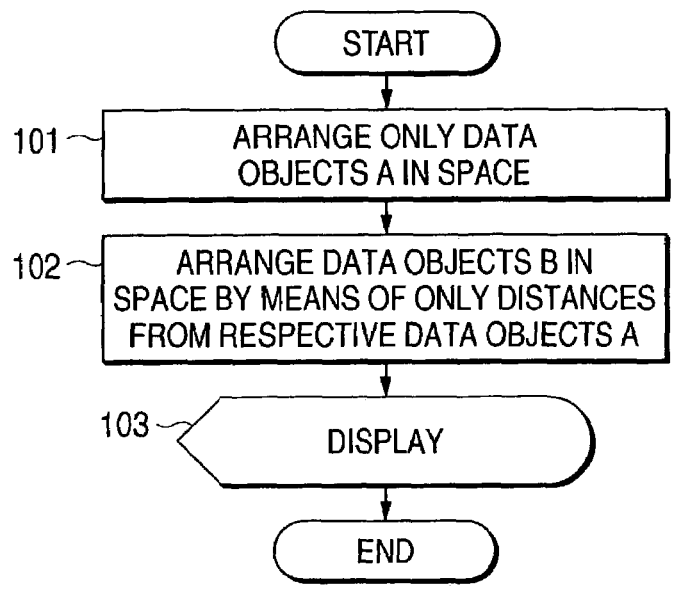
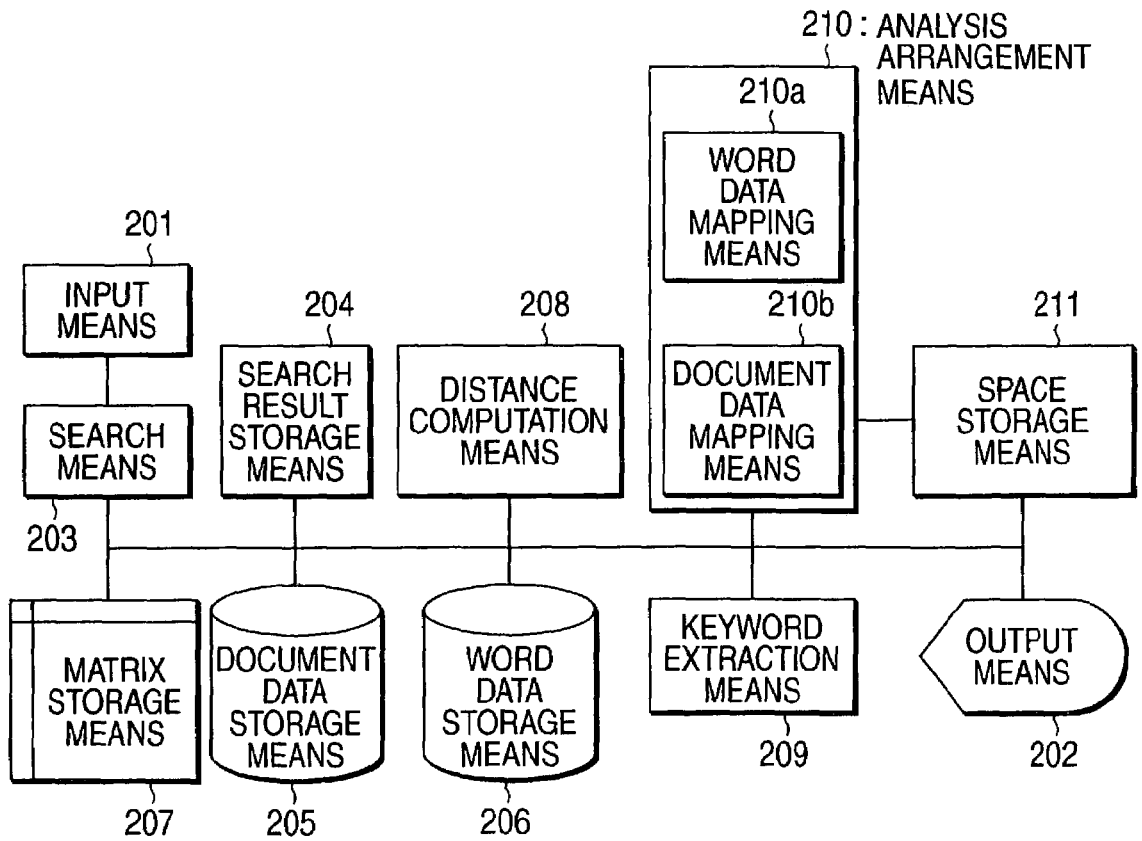

FIG. 9

```
              CLIENT
              1   2   3   4  ···  N
            +---------------------------
COMMODITY 1 | 2   3  [0]  1  ···  5
PRODUCT   2 | 0   1  [2]  9  ···  1
          3 | 0   0  [2]  1  ···  0
          4 |[2   2   0   3  ···  0]  ← VECTOR
          : | :   :   :   :        :    EXPRESSIONS
          M | 1   2  [8]  0  ···  1    OF COMMODITY
                                        PRODUCTS
```
VECTOR EXPRESSIONS OF CLIENTS

FIG. 10

```
            START
              │
1001 ─ INPUT SEARCH CRITERIA
              │
1002 ─      SEARCH
              │
1003 ─ ARRANGE COMMODITY
       PRODUCTS IN SPACE
              │
1004 ─ ARRANGE CLIENTS IN SPACE
       BY MEANS OF ONLY DISTANCES
       FROM COMMODITY PRODUCTS
              │
1005 ─      DISPLAY
              │
             END
```

DISTANCE BETWEEN WORD " i " AND WORD " k "

DEVICE AND METHOD FOR AUTOMATICALLY CLASSIFYING DOCUMENTS USING VECTOR ANALYSIS

BACKGROUND OF THE INVENTION

1. Field of the Invention

The present invention relates to data analysis utilizing an electronic computer and to display of a result of analysis. In particular, the invention can be applied to display of results of document research while the results are classified through use of keywords and analysis and to display of a relationship between clients and commodity products in connection with analysis of a market.

2. Description of the Related Art

A relational matrix defined by words and documents is often employed in classification and analysis of documents. This corresponds to a matrix which is defined by assigning words to rows and documents to columns and recording the number of times words appear in corresponding documents (see FIG. 3). A vector expression of a word can be extracted by picking up the rows of the matrix one by one, or a vector expression of a document can be extracted by picking up the columns one by one. Hence, a distance between two words A and B can be defined by the distance between vectors, a cosine of vectors, or an inner product of vectors. Similarly, a distance between documents can also be defined by a distance between vectors, a cosine of vectors, or an inner product of vectors. Specifically, a distance between words can be expressed by comparison between vectors which employ documents as components, and a distance between documents can be expressed by means of comparison between vectors which take words as components. Further, a distance between a document and a word can be defined by reference to the number of times the word appears in the document.

A relationship between clients and purchased commodity products in relation to marketing is taken as example data which can be expressed in the form of a matrix. In a matrix in which commodity products are assigned to rows, and clients are assigned to columns, if data pertaining to the specific commodity products and quantities purchased by a certain client are recorded, thereby enabling recording of a relationship between clients and commodity products (see FIG. 9). Even in such a case, vector expressions of respective clients or those of respective commodity products can be extracted. A vector of a certain client shows the client's preference for a commodity product. Clients having vectors of the same lengths can be said to have the same preferences. Even in this case, a distance between clients can be expressed by vectors which take commodity products as components. A distance between commodity products can be expressed by vectors which take clients as components.

In this example, documents and words are related to each other in the form of rows and columns of a matrix. Clients and commodity products are also related to each other in the same fashion. A large number of combinations of data are defined in the form of such a relationship. In subsequent descriptions, a matrix is described by taking a relationship between words and documents as an example.

As a result of the proliferation of IT technology and the Internet, the number of documents produced in electronic form is increasing explosively. For instance, electronic versions of existing newspaper articles and existing patent publications, which have already been issued, have reached an enormous volume, and their volume is certain to increase continuously in the future. Effective utilization of such documents inevitably requires search, classification, and analysis means which enable on-target selection of a target document.

The following methods are broadly grouped and available as means for classifying results of search of a document.

(1) A first method is to establish classification criteria beforehand and classify documents according to the criteria. FIG. 17 is a flowchart showing the outline of operation and processing pertaining to the method. At the outset, criteria are manually prepared as a preparatory stage (1701). It is a common practice that, once the criteria have been established, they can be used for general purposes over several occasions. Next, a document is searched (1702), and a cluster of search results is automatically classified in accordance with the criteria (1703). The results are displayed on a per-category basis (1704). This method is suitable for use with newspaper articles for which categories can have been prepared beforehand.

(2) A second method is to locate an aggregation of documents in a space through use of only distances among the documents. Computation is performed repeatedly until location of the aggregation is completed, whereby self-organizing classification becomes feasible. Famous means for realizing the second method include an SOM (self-organizing map) [a reference document: T. Kohonen "Self-organizing Map" Springer-Verlag Tokyo, ISBN 4-431-70700-X(1996)] and a layout based on a spring model [a reference document: Peter Eades: "A Heuristic for Graph Drawing," Congressus Numerantium, Vol. 42 (1984)], [a reference document pertaining to an example applied to analysis of documents: Isamu WATANABE "Visual Text Mining," Vol. 16, No. 2 (2001), Journal of JSAI (Japanese Society for Artificial Intelligence)].

The spring model is a layout method specific to an undirected graph (a graph involving no directions) and can be applied to classification and arrangement of documents and words. For instance, when documents are arranged, documents are deemed as nodes of a graph. The nodes are deemed to be connected together by springs in accordance with a distance between the documents (or the degree of similarity). FIG. 28 shows an example of an initial state.

As shown in FIG. 28, nodes schematically represent documents, and serrated lines schematically represent springs. A system formed from the nodes and the springs is brought to a stable state; that is, a state in which the respective springs are settled with lengths close to their original lengths or without involvement of expansion or contraction. Consequently, similar documents are located adjacent to each other, and non-similar documents are located so as to become distant from each other. FIG. 29 shows such an example.

From the example shown in FIG. 29, it can be visually ascertained that documents A, B, and C are analogous to each other but a document D is not analogous to any of the documents A, B, and C.

The methods, such as the SOM and the spring model, enable realization of an arrangement suitable for an aggregation of documents obtained as a result of search and hence enable flexible classification of documents on a per-search basis. Under these methods, self-organizing classification is performed. Therefore, a result of classification does not necessarily comply with a guideline which is visibly understandable for persons. Hence, a cluster of results is subjected to labeling.

A flowchart shown in FIG. 18 shows the labeling operation. Specifically, documents are first searched (1801), and self-organization and arrangement of the thus-searched documents are performed (1802). On the basis of a result of arrangement, the documents are divided into clusters (1803). The respective clusters are labeled (1804). Finally, the result of arrangement and the labels are displayed (1805). JP-A-8-263514 describes an example to which an SOM is applied as the previously-described self-organizing method. In many occasions, a result of adoption of the SOM is displayed in the form of a cluster of cells, such as that shown in FIG. 22. A result of use of the spring model is often displayed as an arrangement of data in a space, such as that shown in FIG. 20.

(3) A third method is to classify documents in accordance with the degree of proximity to a keyword. FIG. 19 is a flowchart showing the outline of operation and processing of this method. First, documents are searched (1901). The documents obtained as a result of search are afforded keywords by a person, or keywords are automatically extracted for the documents (1902). The keywords are arranged at fixed points in a space (1903). The individual documents obtained as a result of search are arranged in the same space in accordance with the degree of proximity to the keywords (1904). Finally, a result of arrangement is displayed (1905). JP-A-2000-76279 describes an example of this method.

(4) JP-A-10-171823 describes a technique for arranging documents in a given dimensional space in accordance with proximity and non-proximity in terms of semantic contents, by means of clustering documents represented in the form of vectors into an appropriate number of groups and applying mapping means only to typical centers of the clusters. According to this technique, documents to be analyzed are first transformed into vectors by vector transform means 3503. The documents, which have been transformed into vectors, are classified into clusters by clustering means 3504. Then, typical vectors of the respective clusters are extracted by cluster center extraction means 3505. The cluster centers are arranged in a low-dimensional space while distances between the cluster centers are kept as intact as possible. The documents included in the respective clusters are arranged on the basis of the thus-determined arrangement and positions and the result of classification of the vectors determined by the clustering means 3504. At the time of arrangement of documents, the documents are compared with the center of the cluster located adjacent to the cluster to which the vectors of the documents belong.

However, the first classification means enables classification of documents in accordance with only predetermined criteria. This method may be suitable for classifying newspaper articles into categories, such as economics and sports. However, a situation in which search results must be classified in accordance with new criteria is encountered in search of documents at all times. Even when sports are classified into professional sports and amateur sports, the Olympic Games, which have been changed so as to permit participation of professional athletes, may require another criterion. Classification changes according to the circumstances. Hence, a limit is imposed on the method for establishing criteria in advance.

According to the second classification method, computation of distances among all the documents must be performed repeatedly until the documents are settled at appropriate positions (or location of the documents is completed) in order to effect self-organizing classification. When the number of documents to be classified has become enormous, continuation of computation until location of the documents is completed incurs very high expenses. Therefore, the method is to be said to be less practical.

In relation to the spring model, a model pertaining to four nodes is shown in FIG. 28. FIG. 30 is a schematic representation of a model pertaining to eight nodes, in which springs are depicted as lines. As can be seen from this drawing, when the number of nodes is doubled; that is, when four nodes are doubled to eight nodes, the number of springs is quadrupled. When N documents are interconnected with springs, the number of springs is determined as $\{N \times (N-1)\}/2$. Consequently, the number of springs is on the order of the square of N.

Provided that documents can have been arranged in a space through use of the spring model, as shown in FIG. 20, determination of the nature of clusters is a delicate problem. Even when the documents have been clustered in such a manner as shown in FIG. 21, the clusters are not always appropriately labeled with labels (character strings) signifying clusters. Since the clusters are determined through computation of multi-dimensional vectors, there are no guarantees that classification is easily understandable for a person. Even if an attempt is made to extract classified labels from titles of documents and display the thus-extracted labels in a manner as described in JP-A-2000-82068, appropriate labels will not always be extracted when labels of the clustered documents differ from each other or when a large number of documents of the same title are present in another cluster. Hence, the labeling problem cannot be solved unless expensive computation is performed after the documents have been classified and arranged. The same also applies to the SOM.

The third classification method is based on the premise that keywords are fixedly displayed and spaced uniformly from each other. When a person designates keywords, the person is not allowed to set a desired number of desired classification words. Specifically, when, for example, six keywords have been selected, the six keywords will not always be words which are optimal for classification of an aggregation of documents and which represent opposites. For example, when an attempt is made to classify newspaper articles pertaining to sports, words which are not uniform in terms of conceptual or abstract level, such as "Baseball," "Ball Game," "High-school Baseball Games," or "J-League," or which are not suitable for classifying an aggregation of documents may be designated. In a case where keywords are extracted by a computer, even if appropriate keywords are extracted, the keywords are uniformly spaced apart from each other with regard to an aggregation of given documents, and hence there may arise a chance of the aggregation of documents being classified into clusters different from the original characteristics of the documents. More specifically, on the premise that six keywords are arranged in a hexagonal pattern in a manner as described in JP-A-2000-76279, when only one of the six keywords has a meaning unique to the aggregation of documents, appropriate classification and arrangement of the documents should fail to be achieved.

Under the fourth technique, at the time of arrangement of each document, the document is compared with a center of a cluster located in proximity to a cluster to which the document belongs. However, the document is not compared with centers of all clusters. Therefore, even when a document vector classified into a certain cluster actually has a characteristic similar to a center of a cluster located outside the neighborhood of the cluster to which the document belongs, the influence of the center of the cluster located outside the neighborhood is disregarded. Hence, a mapping result accurately reflecting the characteristic of a document can hardly be attained. Moreover, when documents are arranged, the documents are not labeled. Therefore, a displayed result of arrangement may be visually less discernible for a user. In order to realize display of labeled documents, expensive computation, such as computing operation for determining labels on the basis of a result of arrangement of data or a correspondence between labels and data, is required.

SUMMARY OF THE INVENTION

The invention has been conceived to solve the drawbacks of the related art and aims at realizing self-organizing classification of an aggregation of documents through use of only information about the aggregation of documents and effecting high-speed, user-friendly labeling which is suitable for use with an aggregation of documents and complies with actual conditions.

To achieve the object, according to the invention, data included in one of two sets of data are taken as data objects A, and data included in the other set of data are taken as data objects B, provided that a relationship between the two sets of data can be expressed as a relationship between rows and columns of a matrix. Operation of the invention is shown in FIG. 1. The following procedures are follows. First, the data objects A are arranged (101) in a space (e.g., a space of three dimensions or less which is visually ascertainable for a person) through use of only the data objects A in view of distances between the data objects A while the distances are maintained. Next, the data objects B are arranged (102) in the space through use of only distances between the data objects A and B and without use of distances between the data objects B while the distances between the data objects A and B are maintained. Finally, the data objects A and B are displayed (103).

Specifically, the following procedures are performed; namely, a procedure of taking data objects of two types of data objects, the data objects being smaller in number, as data objects A; a procedure of arranging the data objects A by means of, e.g., self-organizing classification; and a procedure of arranging data objects B, which are greater in volume, by utilization and on the basis of arrangement of the data objects A.

Therefore, the information analysis display device of the invention enables high-speed arrangement of the data objects B, the objects corresponding to a large volume of data, by means of arrangement of the data objects A. Arrangement of the data objects A is taken as labels showing attributes of a data distribution, thereby narrowing down a result of search of documents or analysis of a relationship between data. As a result, labeling and data mapping can be implemented simultaneously. Mapping results are labeled, which enables display of data analysis in a form that is visually understandable for the user.

BRIEF DESCRIPTION OF THE DRAWINGS

FIG. 1 is a flowchart showing the outline of processing of the invention;

FIG. 2 is a block diagram showing the configuration of a document classification device according to a first embodiment of the invention;

FIG. 9 is a conceptual rendering showing a matrix formed from commodity products and clients according to the second embodiment;

FIG. 10 is a flowchart showing the outline of operation and processing of the second embodiment;

Figure 3:
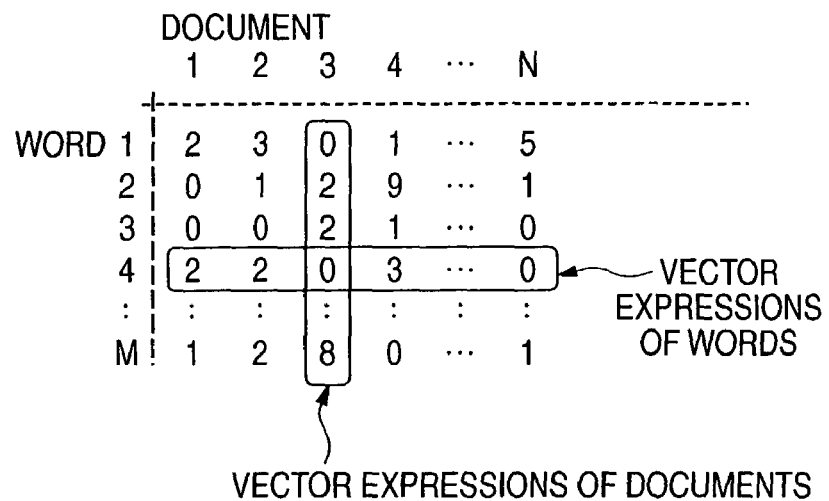
FIG. 3 is a conceptual rendering showing a matrix formed from documents and words according to the first embodiment of the invention.

In the figures, the reference numeral 201 refers to input means; 202 to output means; 203 to search means; 204 to search result storage means; 205 to document data storage means; 206 to word data storage means; 207 to matrix storage means; 208 to distance computation means; 209 to keyword extraction means; 210 to analysis arrangement means; 210a to word data mapping means; 210b to document data mapping means; 211 to space storage means; 801 to input means; 802 to output means; 803 to search means; 804 to temporary data storage means; 805 to client data storage means; 806 to commodity product data storage means; 807 to matrix storage means; 808 to distance computation means; 809 to sales data storage means; 810 to analysis arrangement means; 810a to commodity product data mapping means; 810b to client data mapping means; and 811 to space storage means.

DETAILED DESCRIPTION OF THE PREFERRED EMBODIMENTS (First Embodiment)

A first embodiment of the invention will be described hereinbelow. The first embodiment is directed toward a document classification device which searches documents and classifies and arranges search results.

FIG. 2 is a block diagram showing the device of the first embodiment.

As shown in FIG. 2, the device comprises input means 201 for inputting search criteria; output means 202 for outputting a search result and a result of classification and arrangement; search means 203 for performing search operation; search result storage means 204 for storing a search result; document data storage means 205 for storing document data; word data storage means 206 for storing information about words; matrix storage means 207 for storing matrix data pertaining to words and documents; distance computation means 208 for computing a distance between words, that between documents, and that between a word and a document, through use of a matrix; keyword extraction means 209 for extracting a keyword from an aggregation of documents; analysis arrangement means 210 for arranging data in a space on the basis of a distance between data; and space storage means 211 for storing information about a space. The analysis arrangement means 210 is formed from word data mapping means 210a and document data mapping means 210b. In the appended claims the word data mapping means 210a is described as label mapping means, and the document data mapping means 210b is described as data mapping means.

As shown in FIG. 3, words and documents are recorded in the matrix storage means 207 in the form of rows and columns employed in a matrix. A component (i, k) of the matrix signifies the number of times a word "i" appears in a document "k."

Figure 4:
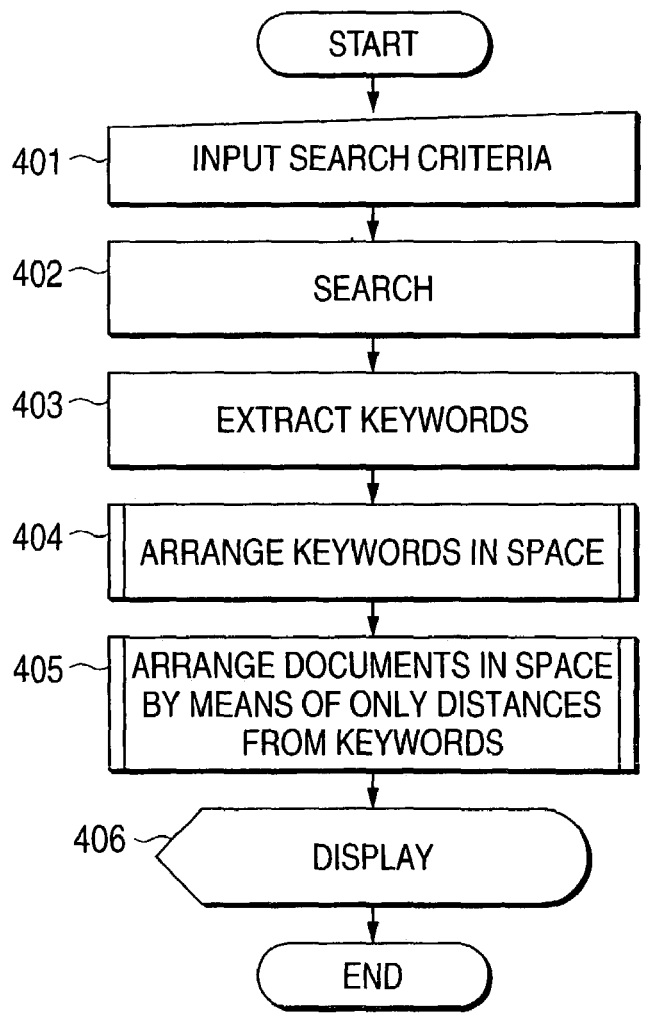
FIG. 4 is a flowchart showing the outline of operation and processing of the first embodiment.

FIG. 4 is a flowchart showing the outline of utilization and operation of the device.

(Step 401) First, a user enters search criteria by way of the input means 201.

(Step 402) The search means 203 performs search operation, and an aggregation of documents obtained as a result of search is stored in the search result storage means 204.

(Step 403) On the basis of the search result, the keyword extraction means 209 extracts a keyword. A known technique described in, e.g., JP-A-11-25108, is used for extracting a keyword (or a characteristic word).

Figure 5:
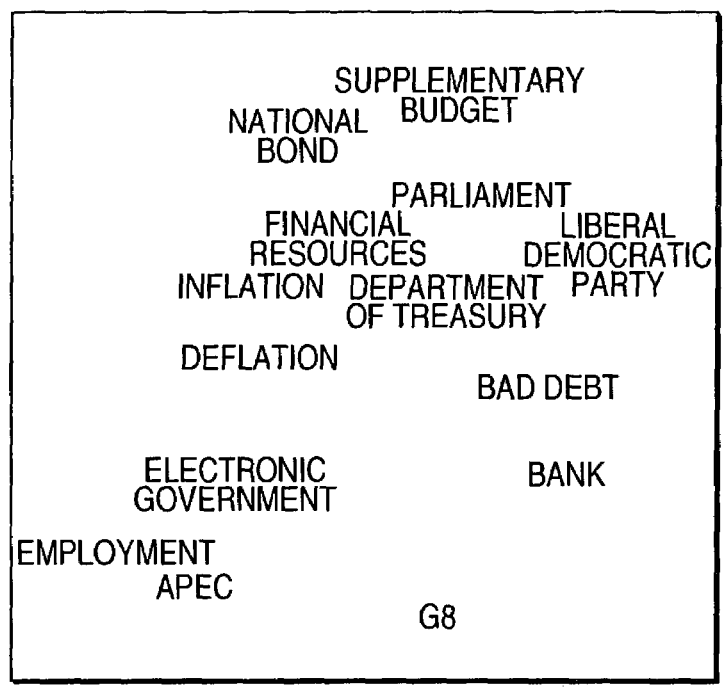
FIG. 5 is a schematic diagram showing an example result of arrangement of only words according to the first embodiment.

(Step 404) The distance computation means 208 computes a distance between extracted keywords on the basis of the information stored in the matrix storage means 207. The word data mapping means 210a arranges the keywords in a two-dimensional or three-dimensional space of the space storage means 211. A spring model, which is a known method, is used for locating the keywords in a space, which will be described in details later. The keywords located in a space are expressed as notations assigned to the keywords. FIG. 5 shows an example in which only keywords are located in a two-dimensional space.

Figure 6:
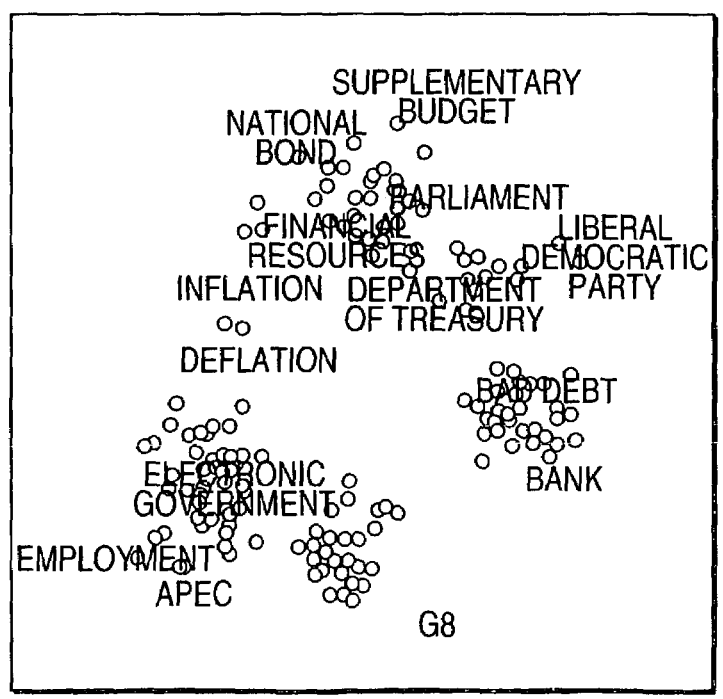
FIG. 6 is a schematic diagram showing an example of an output result of the first embodiment.

(Step 405) The distance computation means 208 computes the distance between a located keyword and a document obtained as a result of search performed in step 402 on the basis of the information stored in the matrix storage means 207. The document data mapping means 210b locates documents in the two-dimensional or three-dimensional space of the space storage means 211, which will be described in detail later. FIG. 6 shows an example of arrangement of documents in a two-dimensional space. Circles provided in the drawings denote respective documents.

(Step 406) Finally, a result of arrangement is output from the output means 202.

Location of keywords in a space to be performed in step 404 will now be described.

Figure 31:
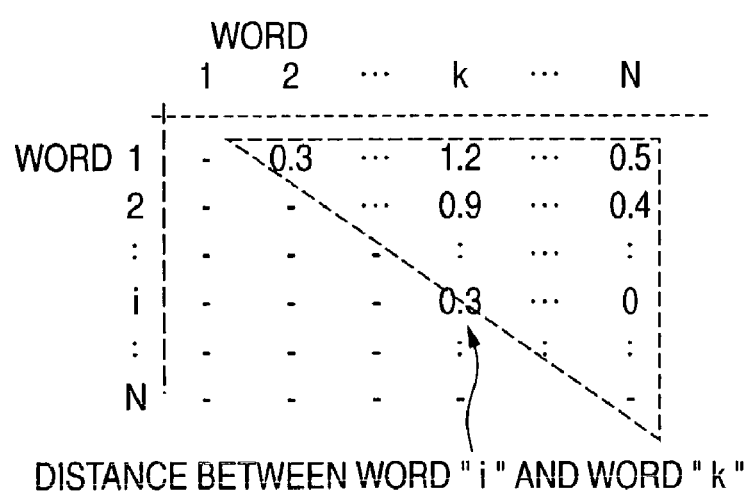
FIG. 31 is a schematic diagram showing a matrix which stores a result of computation of distances between words according to the first embodiment.

A distance between keywords (words) can be computed from information stored in the matrix storage means 207. Specifically, a distance can be defined on the basis of vector expressions of words; that is, a distance between vectors, a cosine between vectors, or an inner product of vectors. Distances between all the keywords to be located are computed by the distance computation means 208 in advance. Computation results are temporarily stored in the form of a triangular matrix such as that shown in FIG. 31.

Figure 28:
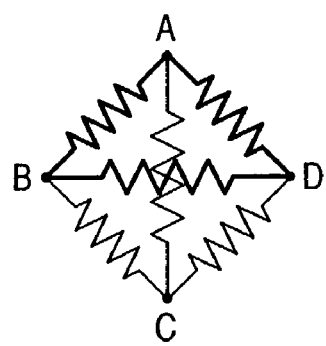
FIG. 28 is a schematic diagram showing a physical model of a spring model and an initial arrangement of the spring model.
Figure 29:
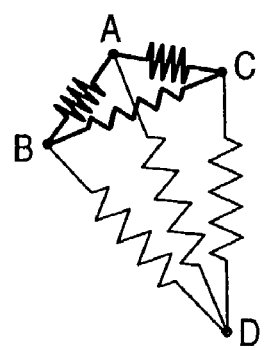
FIG. 29 is a schematic diagram showing the physical model of the spring model and an example of a final result.
Figure 30:
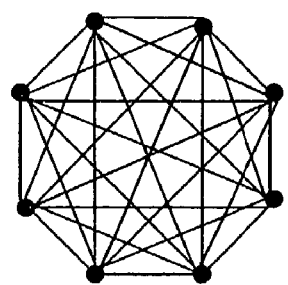
FIG. 30 is a schematic diagram showing a physical model including eight nodes in the spring model, and an initial arrangement of the physical model.
Figure 32:
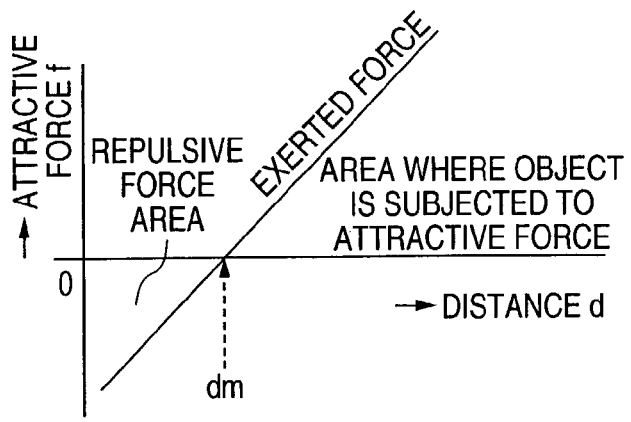
FIG. 32 is a schematic diagram showing a relationship between distances and forces in the spring model.

All the keywords are interconnected by means of springs having lengths corresponding to the distances computed from the relationship between vectors. In the initial state, keywords are arranged at appropriate locations; for example, a single circumference in a two-dimensional space, at uniform intervals. FIG. 28 or 30 schematically shows the thus-arranged keywords. In relation to each of the springs, when the spring has a length corresponding to a distance dm computed from the relationship between vectors, no force is exerted on the spring. However, when the spring expands, attractive force acts on the spring. In contrast, when the spring contracts, repulsive force acts on the spring. FIG. 32 shows the relationship between the expansion and contraction and the attractive force and repulsive force. In FIG. 32, the horizontal axis denotes distance, and the vertical axis denotes the strength of the attractive force. The longer a distance, the stronger a attractive force. If the keyword is located at a position shorter than an appropriate distance dm, negative attractive force; that is, repulsive force, acts on the keyword. In the initial state, the keywords have been located at desired locations without regard to the forces of springs. Hence, forces act on respective nodes (words).

Figure 33:
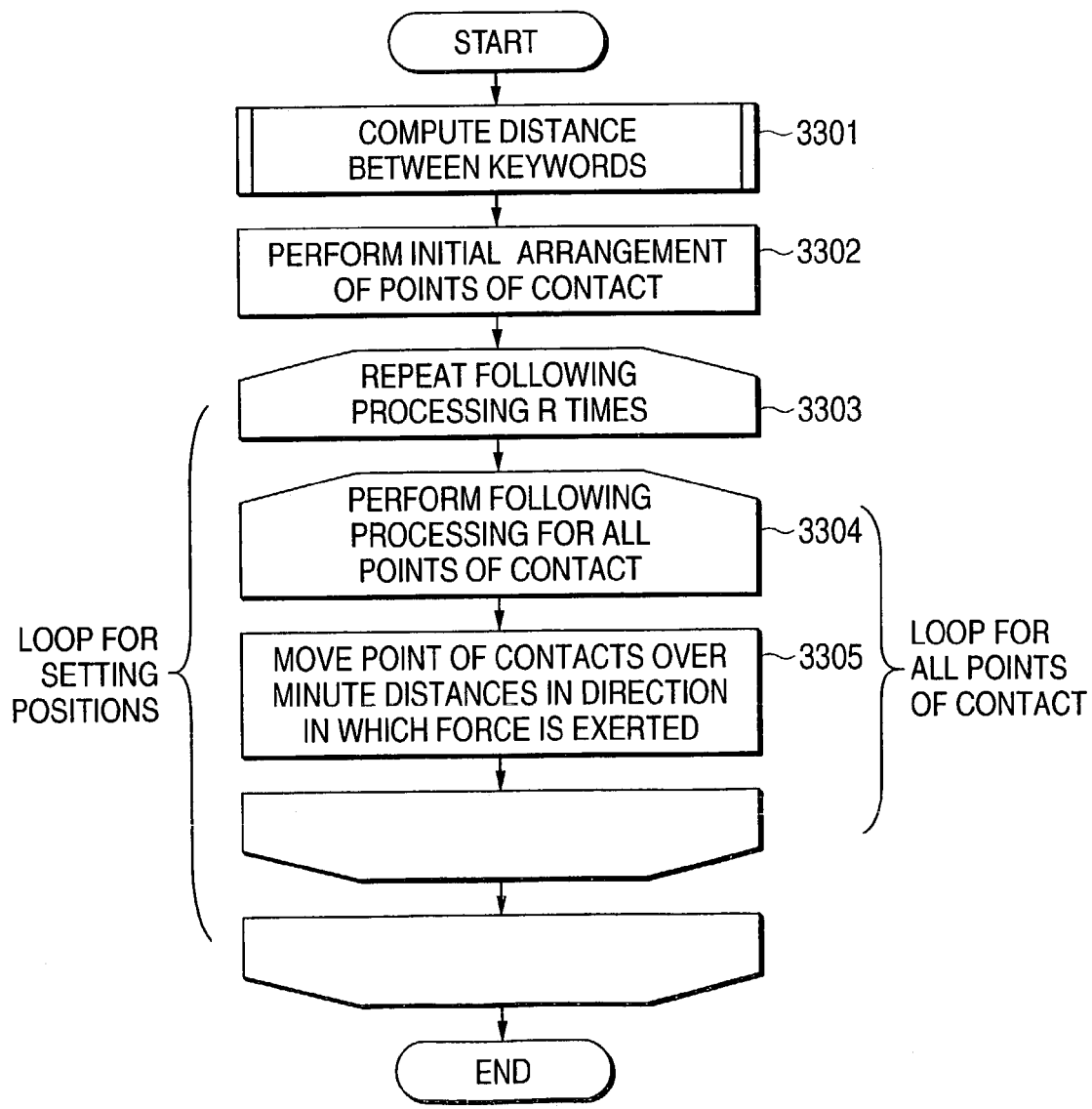
FIG. 33 is a flowchart showing processing for arranging words according to the first embodiment.

Next, in relation to a system formed from nodes and springs, the nodes are minutely moved, thereby moving the nodes to positions where the system becomes stable, thus rendering the entire system stable. A round of required computation operations will be described by reference to FIG. 33.

(Step 3301) First, the distance computation means 208 computes a distance between keywords on the basis of the information stored in the matrix storage means 207. A computation result is temporarily stored in the form of a triangular matrix such as that shown in FIG. 31.

(Step 3302) Keywords are deemed to be nodes, and a system is deemed to be formed from the nodes interconnected by springs having lengths corresponding to distances between the nodes. The nodes are located at initial positions in a two-dimensional (three-dimensional) space. The initial positions may be any locations. For instance, in the case of a two-dimensional space, initial positions may be provided along a circumference. In the case of a three-dimensional space, initial positions may be provided on a single spherical surface.

(Step 3303) In step 3303, processing pertaining to steps 3304 and 3305 is repeated a specified number of times R.

(Step 3304) All the nodes are subjected to processing pertaining to step 3305.

(Step 3305) Forces of all the springs exerted on one node "i" are computed and merged into a single net force. A resultant net force is oriented in a certain direction, and the node is moved in that direction over only a minute distance $k \times \alpha(r) \times f$ corresponding to the magnitude of the net force. Here, "f" designates the magnitude of net force, and "k" designates a constant to be used for converting a force into a distance.

The term $\alpha(r)$ employed in step 3305 is a parameter which becomes smaller as processing is repeated, in accordance with the number of times processing is repeated in step 3303. For instance, the term is given by the following equation.

$\alpha(r) = 1 - (r/R)$

R designates a number of times processing is to be repeated, and "r" designates the number of times currently achieved. As a result of use of the parameters, the traveling distance becomes shorter as processing is repeated. Consequently, the nodes are settled at positions where the entire system becomes stable.

In place of the spring model, the existing SOM method may be used for arranging the keywords in step 404.

The above descriptions are detailed explanations of processing pertaining to step 404. Next, arrangement of documents to be performed in step 405 will now be described.

A distance between a word and a document can be computed by a matrix shown in FIG. 3. A distance between a word "p" and a document "q" can be defined as a magnitude that is inversely proportional to a matrix component (p, q). Specifically, if a certain word "p" appears many times in a certain document "q," the matrix component (p, q) becomes greater, and hence the reciprocal of the matrix component becomes smaller. Hence, the word is located closer to the document. However, if a certain document "b" is considerably larger than the document "a" (i.e., in terms of the number of words), simple comparison between the distance to the document "a" and the distance to the document "b" cannot be made. Hence, the matrix component must be subjected to normalization; that is, division of the matrix component by the size of each document. Such processing is computed by the distance computation means 208 on the basis of the information stored in the matrix storage means 207.

Figure 7:
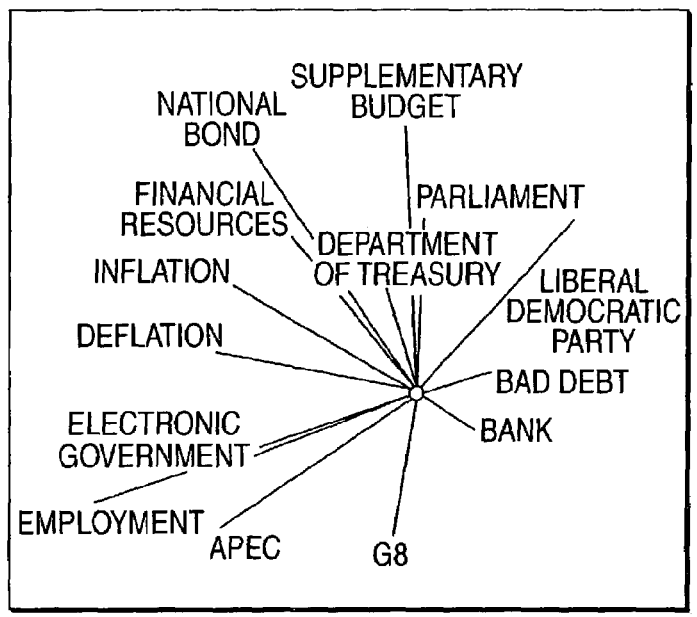
FIG. 7 is a schematic diagram showing computation required to arrange documents according to the first embodiment.

Arrangement of a document to be performed in step 405 is computed by application of the spring model. Here is conceived a system in which each document is connected with the words that have already been located, by means of springs having lengths corresponding to distances between the words and the document. FIG. 7 shows a document picked up as an example system. In FIG. 7, springs are schematically shown as lines. A difference between this system and those shown in FIGS. 28 and 30 lies in that words have already been located and fixed in the system shown in FIG. 7. Hence, the only requirement is to find an arrangement of the document in which the springs become stable, by moving only one document. In contrast, in the case of the system shown in FIG. 28, positions where the system (springs) becomes stable must be determined while all nodes are being moved.

Figure 34:
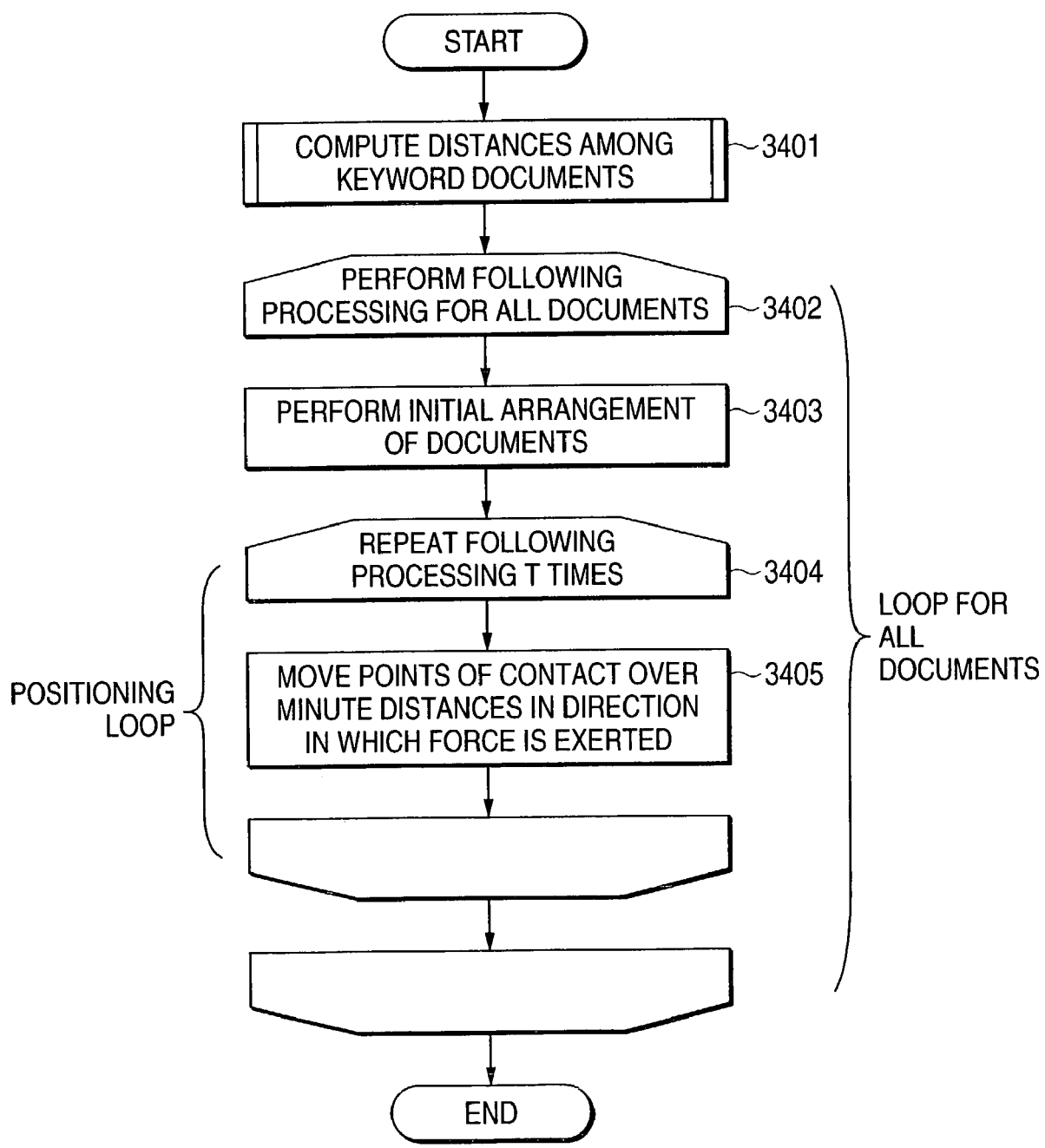
FIG. 34 is a flowchart showing processing for arranging words according to a second embodiment of the invention.
Figure 35:
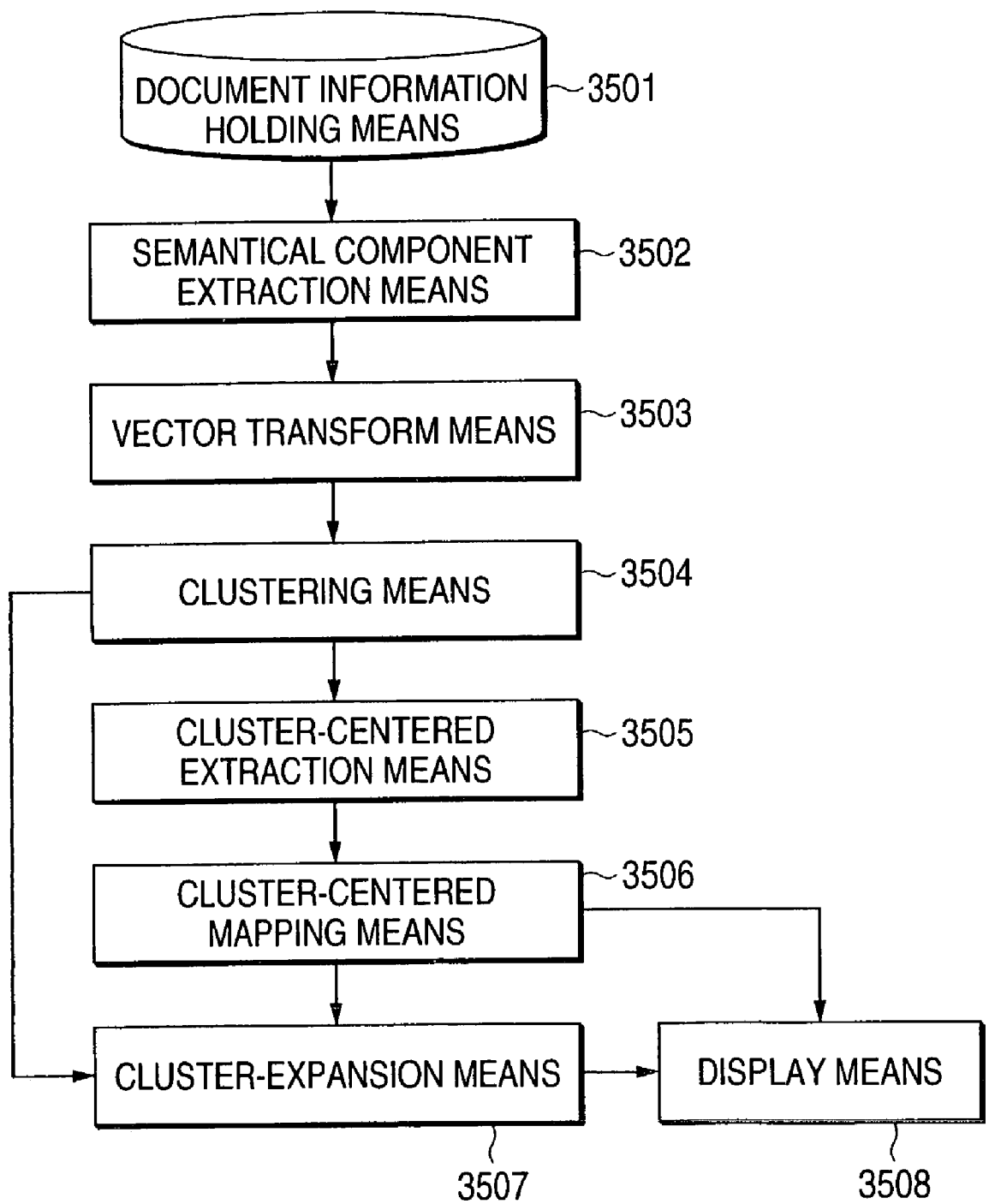
FIG. 35 is a flowchart showing the outline of processing pertaining to a fourth document classification method in the related art.

Required computation will now be described by reference to FIG. 34.

(Step 3401) The distance computation means 208 computes a distance between each word and a document on the basis of the information stored in the matrix storage means 207, and a computation result is temporarily stored.

(Step 3402) All documents are subjected to the following processing.

(Step 3403) The documents are initially arranged. Initial arrangement may be performed at any locations.

(Step 3404) Processing pertaining to step 3405 is repeated a specified number of times T.

(Step 3405) Forces of all springs connected to a document are computed and merged into a single net force. The net force is oriented into a certain direction. A node is moved over only a distance $k \times \alpha(r) \times f$ corresponding to the magnitude of the net force. Here, "f" denotes the magnitude of the net force, and "k" denotes a constant to be used for converting a "force" into a distance. The term $\alpha(r)$ is an attenuation parameter analogous to that employed in step 3305.

The foregoing descriptions are detailed explanations of processing pertaining to step 405.

The invention is characterized by the order in which processing pertaining to step 404 and that pertaining to step 405 are to be performed. Specifically, a small number of keywords are arranged through use of the spring model. Next, a large number of documents are located on the basis of only a positional relationship between the fixed keywords. Distances between documents are not computed.

In general, when a document is retrieved from a large database, the number of searched documents Q often reaches hundreds of documents. If distances between documents are computed through use of a known method and the documents are subjected to self-organizing classification by means of the spring model, computation must in principle be performed Q×Q times. Computation of a distance must be repeated while the respective documents are moved over minute distances until a position where balance between distances is maintained is found; that is, until a stable state of a system formed from springs is found. To this end, computation must be performed Q×Q×R times (R denotes the number of repetitions of computation until documents are settled), wherein Q is on the order of hundreds and R is on the order of hundreds to tens of thousands.

Figure 20:
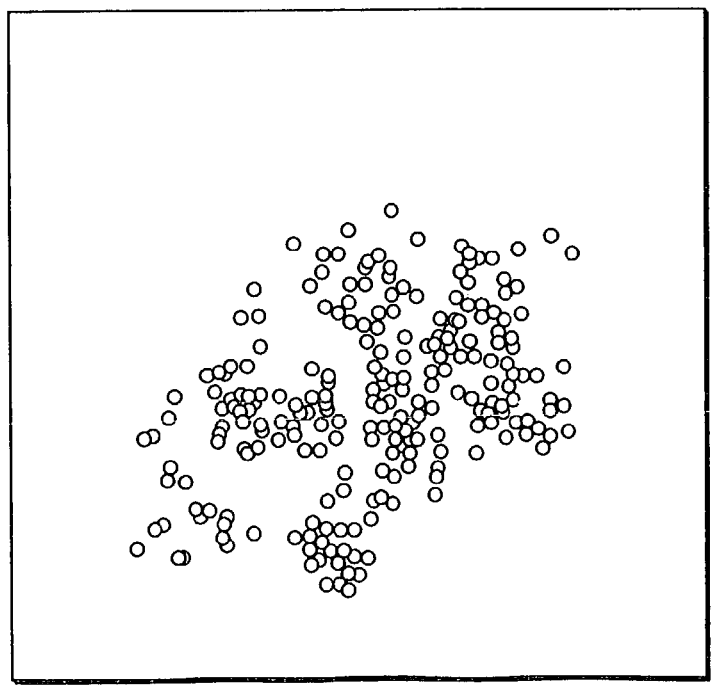
FIG. 20 is a schematic diagram showing an example result of classification and arrangement of data and documents based on the related-art spring model.
Figure 21:
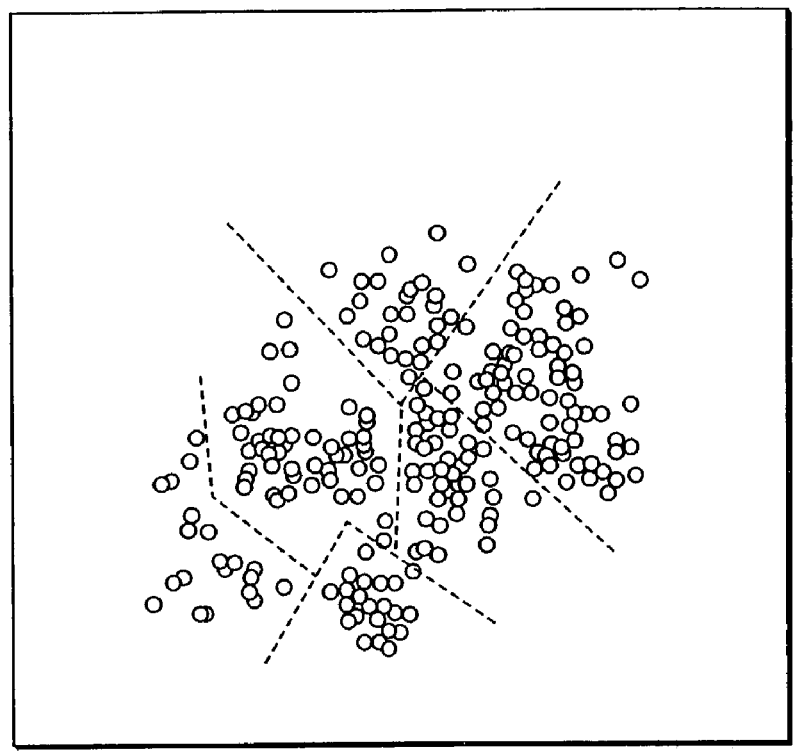
FIG. 21 is a schematic diagram showing an example in which the example result of classification and arrangement of data and documents based on the spring model of the related-art is clustered and classified.
Figure 22:
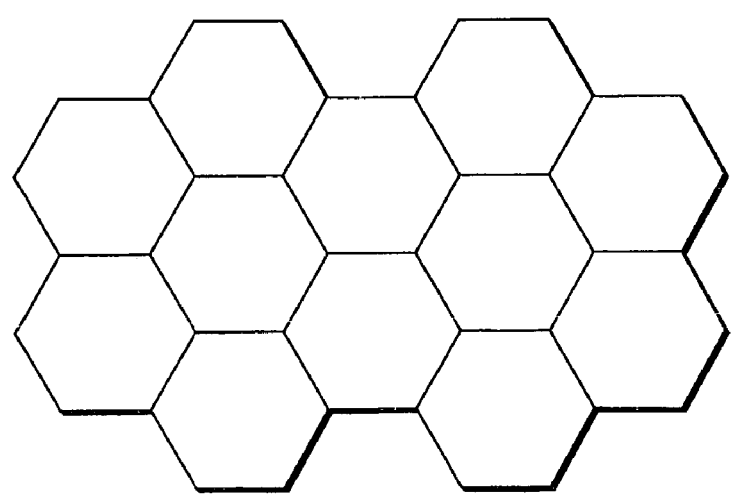
FIG. 22 is a schematic diagram showing an example display of a classification result using a related-art SOM.

A display result is a result of classification of only the documents such as that shown in FIGS. 20 and 22. The result is not comprehensible for the user unless appropriate labels are attached to the documents. Provided that the number of labels is P and that computation of the order of P×Q×S times (S is a constant) is required, computation on the order of (Q×Q×R+P×Q×S) is required.

When the invention is compared with the case set forth, labels correspond to keywords. Hence, the number of keywords is taken as P. Computation on the order of P×P×R times is required for effecting self-organizing arrangement. Further, computation on the order of P×Q×T times (T is a constant) is required for arranging documents Q through use of fixed keywords. Hence, these computation operations require computation on the order of (P×P×P+P×Q×T) times.

The number of classification keywords available for the user is at most 10 to 30 words. Hence, provided that documents are on the order of hundreds and keywords are on the order of a few tens, the following relationship can be presumed.

$$Q=10\times P$$

The existing method involves computations on the order of (100×P×P×R+10×P×P×S). In contrast, the present invention involves computations on the order of (P×P×R+10×P×P×T). Depending on S or T, the amount of required computations becomes about one-tenth or one-hundredth that required in the related art. Eventually, the amount of memory to be utilized becomes small.

Figure 15:
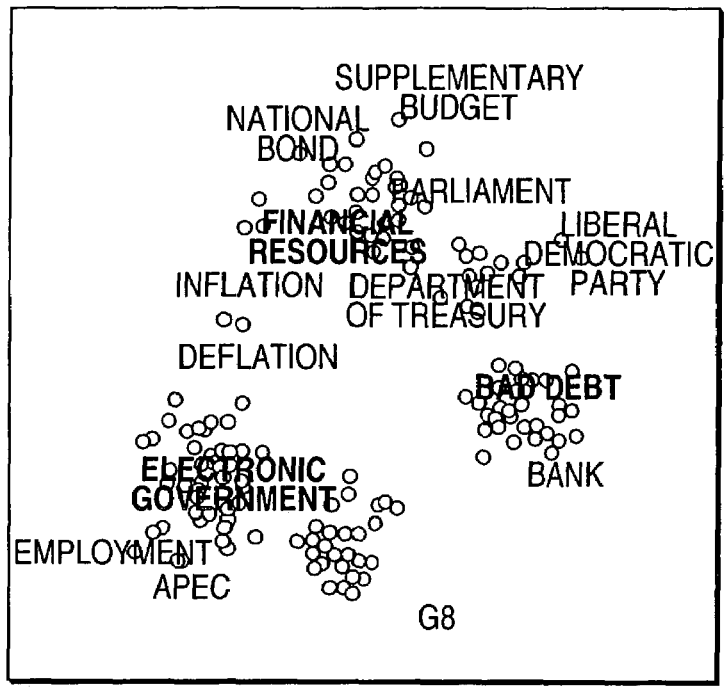
FIG. 15 is a schematic diagram showing an example of highlighted display of a word according to the second embodiment.

As shown in FIG. 6, documents are simply provided around a word. In order to provide the user with information in an easily understandable manner, a word attracting a large number of documents; that is, a word which is determined to be close to a large number of documents as a result of computation of distances of vectors (a distance, a cosine, and an inner product) through use of a matrix can be highlighted. Proximity of a specific word to documents and the number of the documents can be computed immediately. FIG. 15 shows an example in which a keyword attracting a larger number of documents; that is, documents which are greater in number to a threshold value, is highlighted. As a result, the nature of a keyword used to classify the aggregation of documents can be analyzed.

Figure 16:
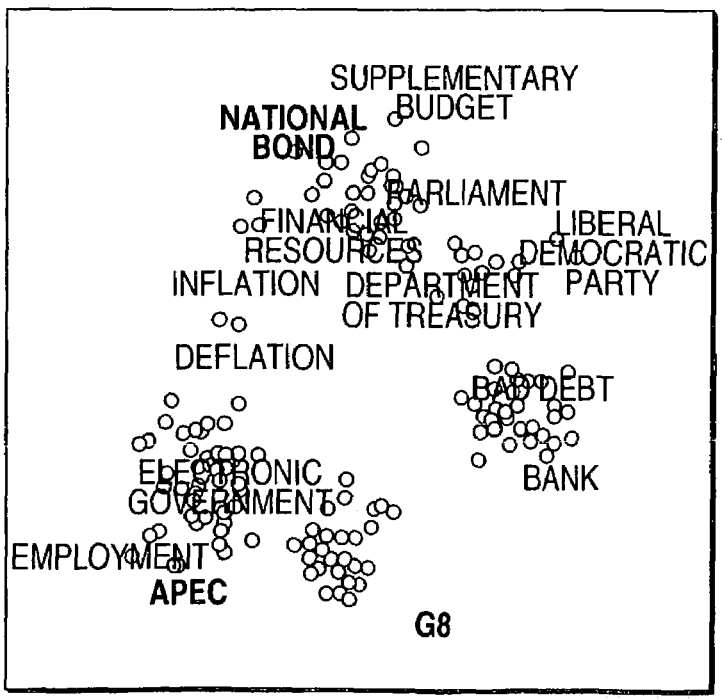
FIG. 16 is a schematic diagram showing the example of highlighted display of a word according to the second embodiment.
Figure 17:
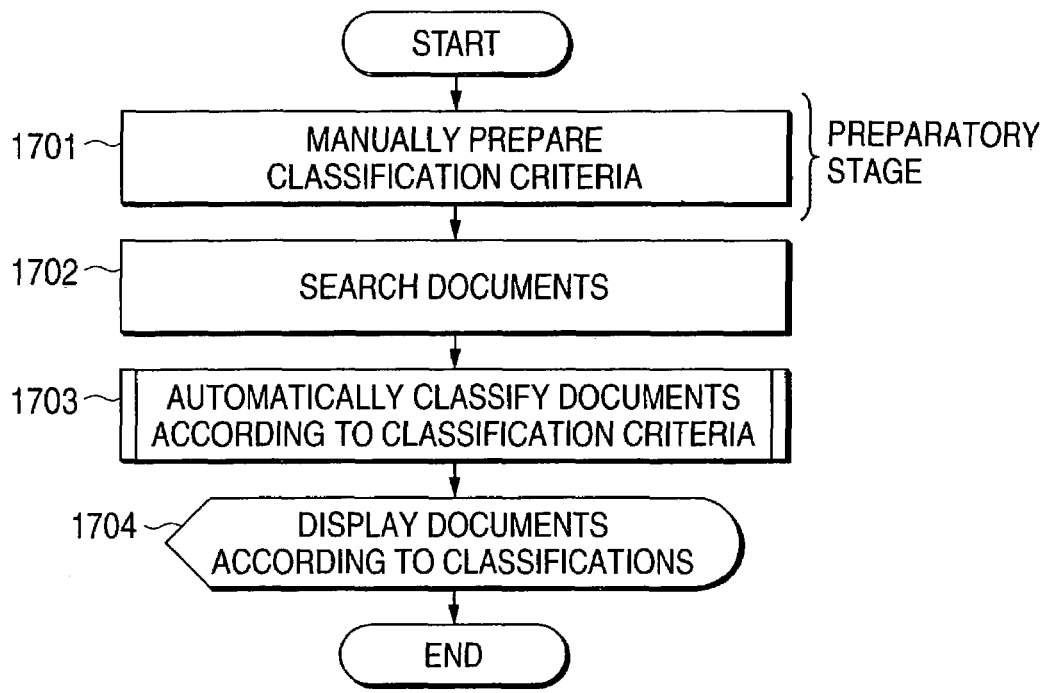
FIG. 17 is a flowchart showing the outline of processing pertaining to a first example of a related-art document classification method.
Figure 18:
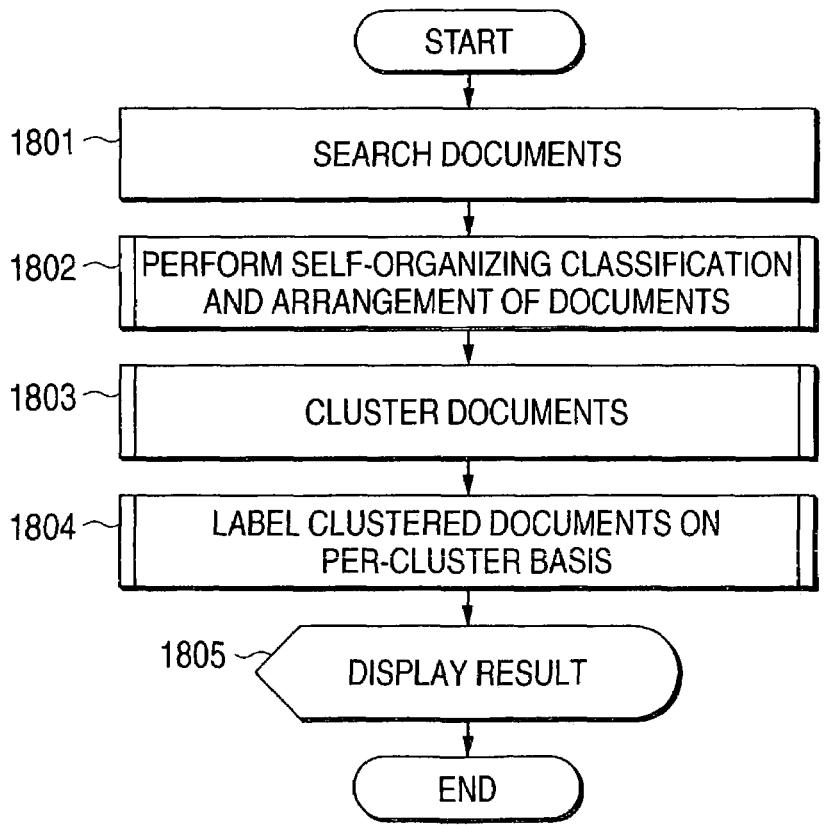
FIG. 18 is a flowchart showing the outline of processing pertaining to a second example of a related-art document classification method.
Figure 19:
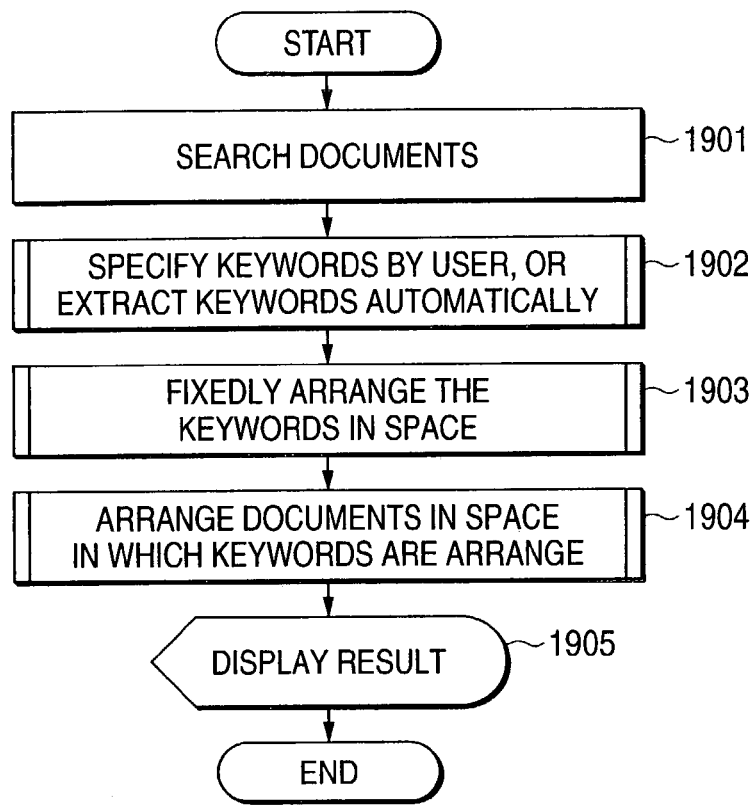
FIG. 19 is a flowchart showing the outline of processing pertaining to a third example of a related-art document classification method.

In contrast, a keyword which has failed to attract a large number of documents can be highlighted. The reason for this is that proximity of a specific word to documents and the number of the documents can be computed readily in the same manner as mentioned previously through use of the matrix storage means 207 and the distance computation means 208, both being shown in FIG. 2. A keyword which has failed to attract a large number of documents is an effective word to be used for narrowing down search results during search. A guideline for a word to be used for search can be provided to the user by means of highlighting such a keyword. FIG. 16 shows an example in which a keyword having failed to attract a large number of documents is highlighted.

Figure 23:
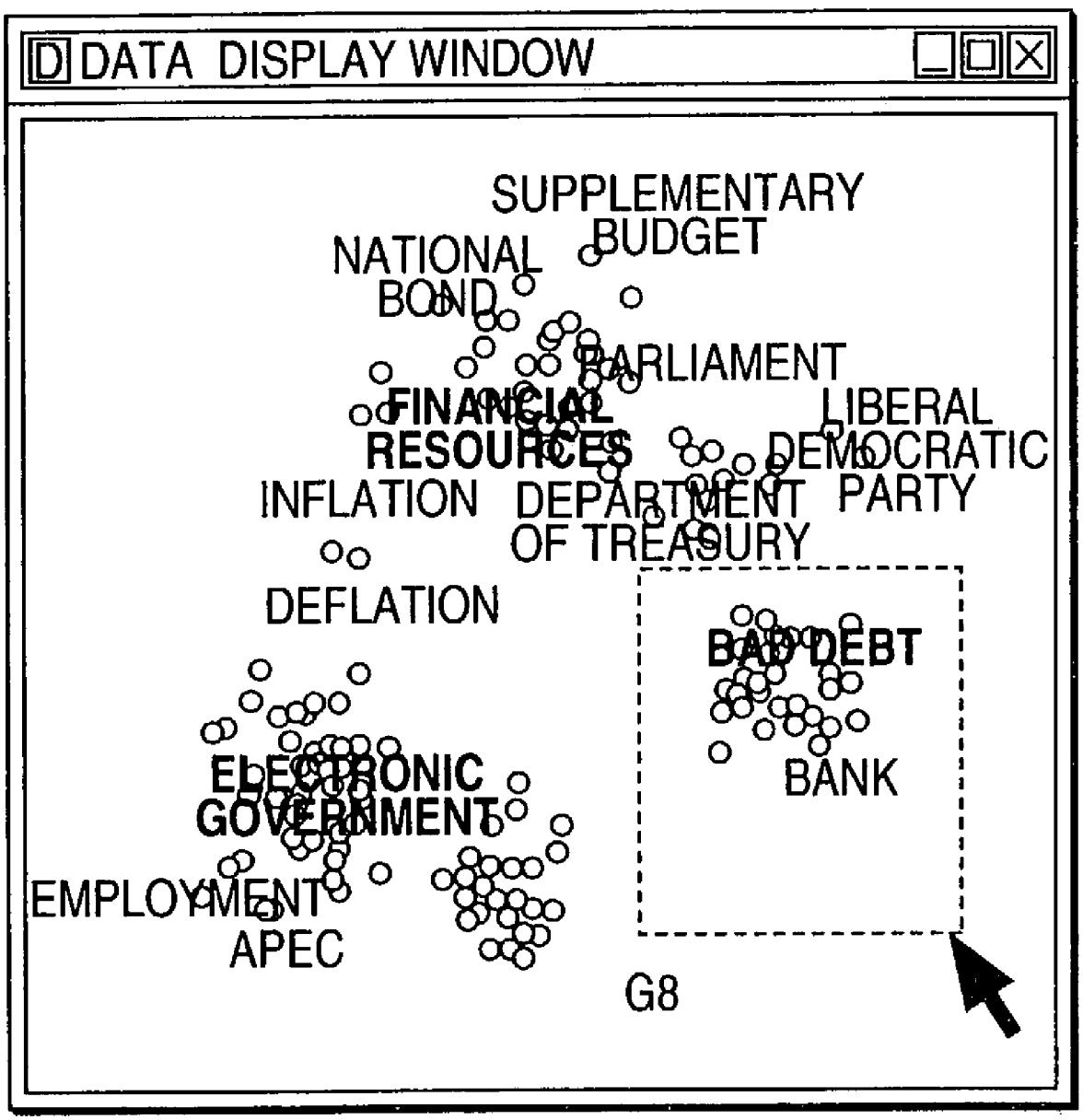
FIG. 23 is a schematic diagram showing operation of a GUI in connection with an output result of the first embodiment.
Figure 24B:
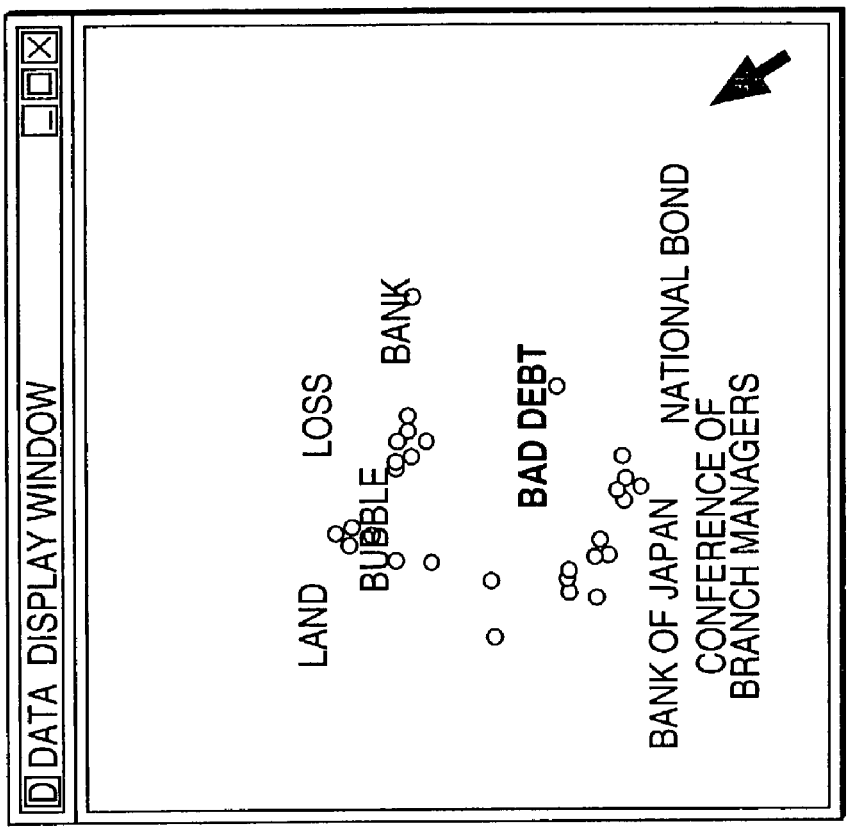
FIGS. 24A and 24B are schematic diagrams showing an operation for re-classifying and re-arranging a subset according to the first embodiment.
Figure 24A:
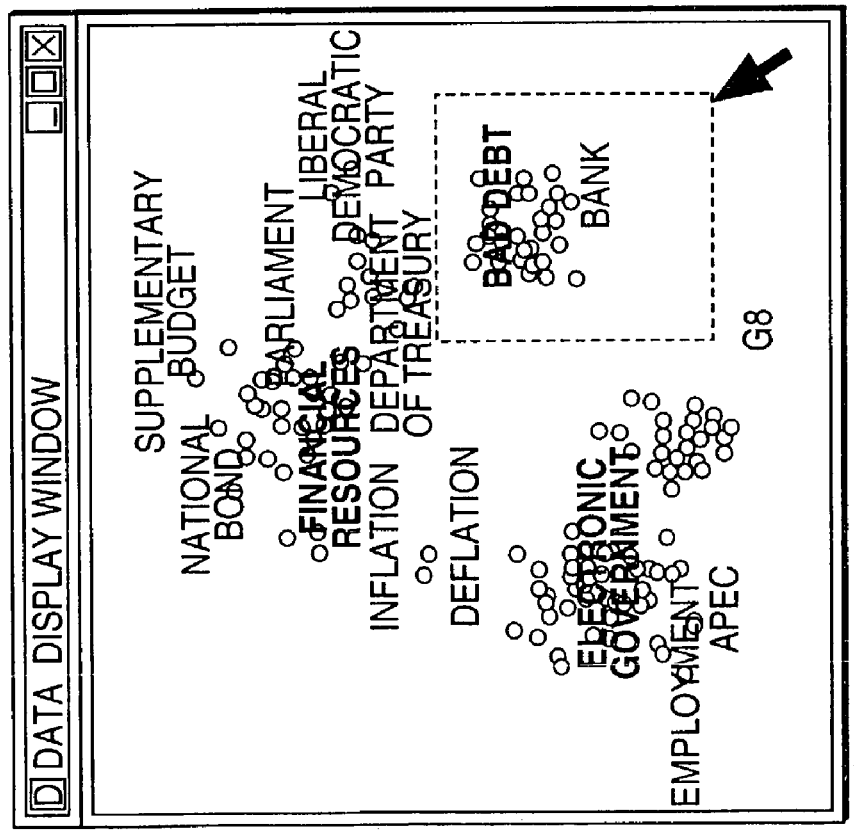

As shown in FIG. 23, the data that have been classified and arranged once are selected by use of a GUI (graphical user interface) for further analysis. In addition to including operation and processing, such as re-classification and re-arrangement of only a selected aggregation of documents as described in, e.g., FIGS. 24A and 24B, conceivable analysis operations include an operation for extracting a keyword from only an aggregation of documents—which has been re-searched and re-selected while only an aggregation of selected terms are taken as search terms—by deleting a displayed and selected aggregation of documents, thereby re-selecting, re-arranging, and re-searching the words.

Figure 25:
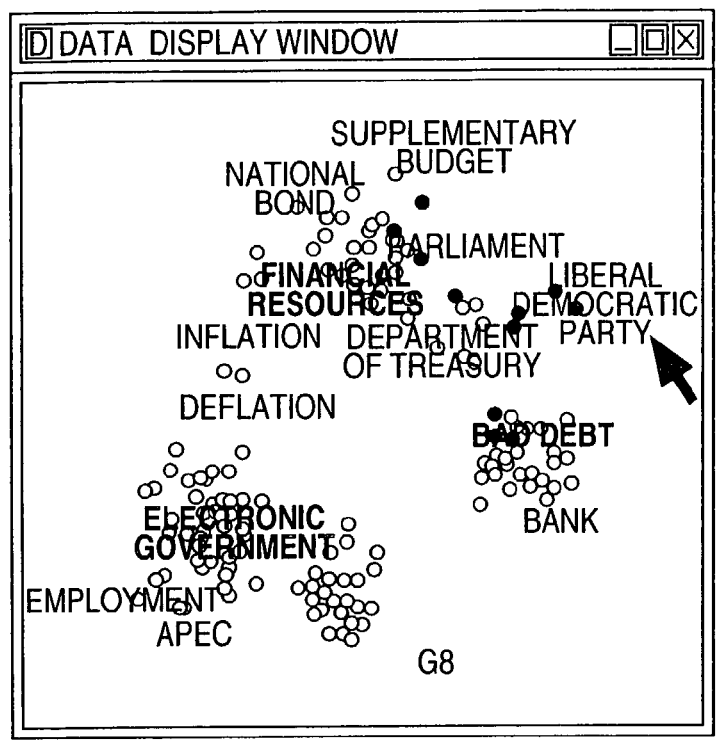
FIG. 25 is a schematic diagram showing processing for highlighting a related document according to the first embodiment.
Figure 26:
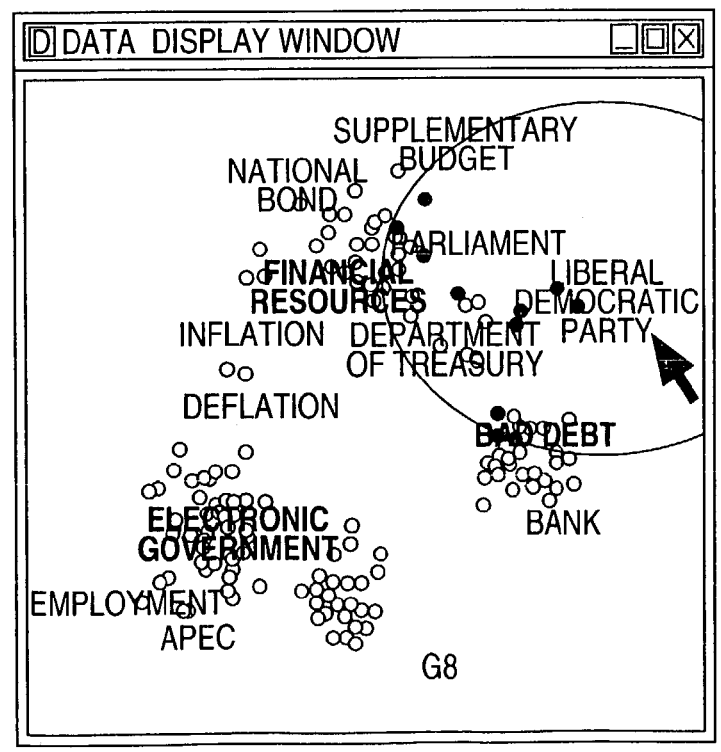
FIG. 26 is a schematic diagram showing processing for displaying a range of related documents according to the first embodiment.

A word is selected, and documents close to the word are highlighted (FIG. 25). Alternatively, a range of documents close to the word can be displayed (FIG. 26).

Figure 27B:
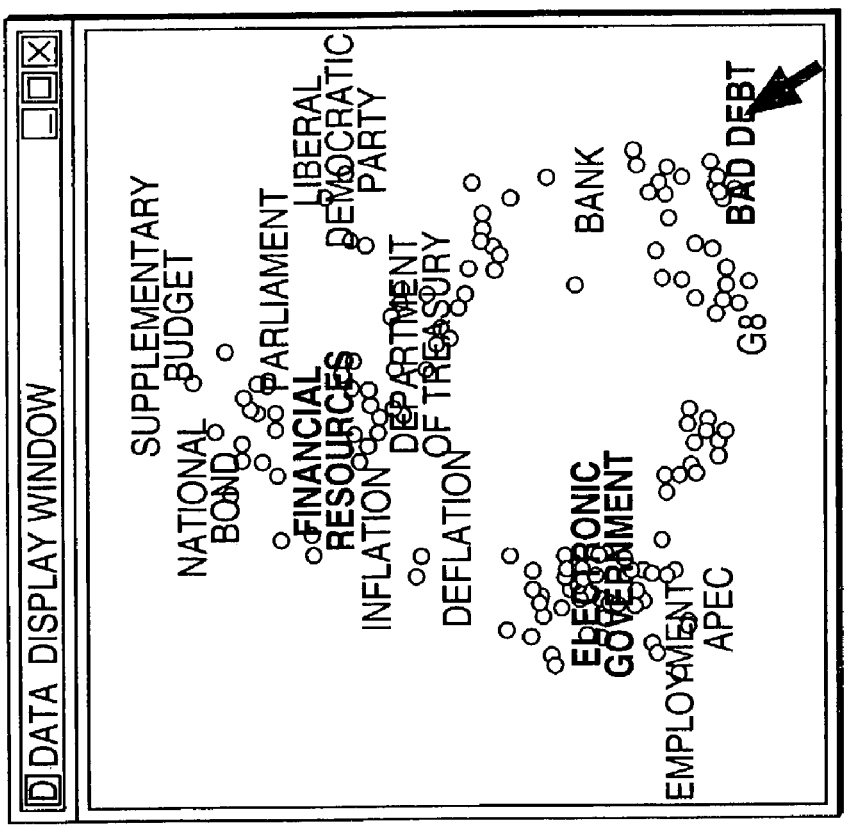
FIGS. 27A and 27B are schematic diagrams showing operation and processing for moving words and for dynamically re-arranging documents according to the first embodiment.
Figure 27A:
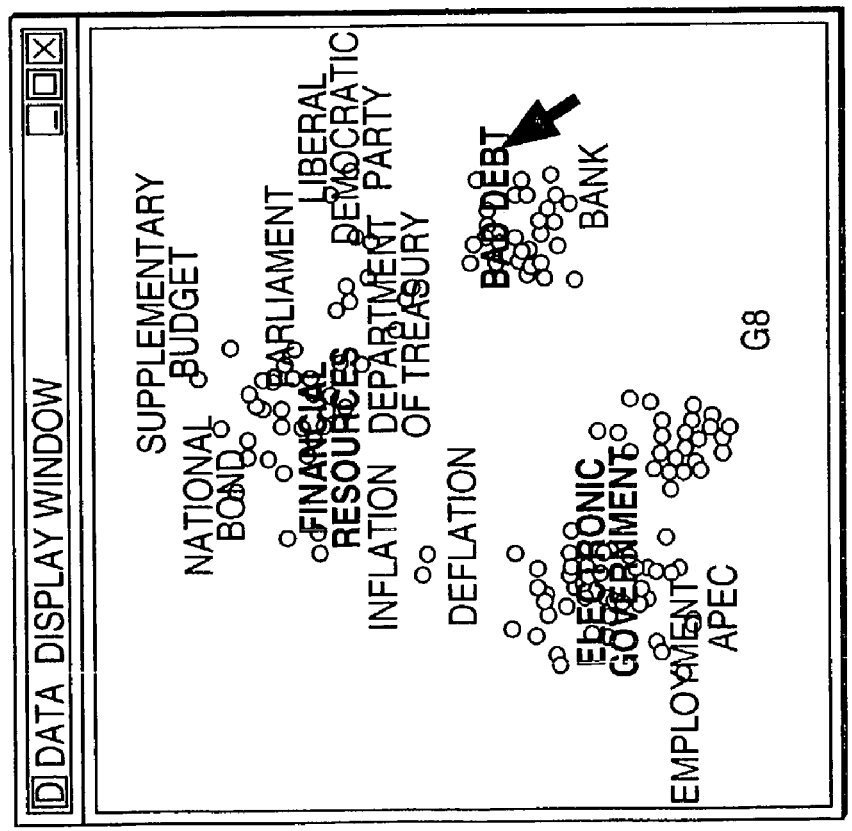

First, a word is selected, and the thus-selected word is moved on the arrangement, thereby enabling a dynamic change in the arrangement of documents (FIGS. 27A and 27B).

In the embodiment, documents are arranged after 10 to 20 keywords or thereabout have been located. However, it may be the case that only documents are first arranged according to the self-organizing method for analyzing about tens of documents, and tens of keywords to hundreds of keywords are arranged through use of only documents which have been subsequently arranged. In this case, the keywords can be clustered by means of the arranged documents. Alternatively, as a result of the keywords being clustered through use of the documents, the keywords can be used for supporting conception. In this way, a small number of data objects have first been arranged according to the self-organizing method. Subsequently, a larger number of different types of data objects are arranged, thereby enabling arrangement and analysis of data which entail a small amount of computation.

As has been described, in the embodiment, only keywords have been arranged in a space in a self-organizing manner, and documents are arranged one by one in accordance with distances from the keywords. Consequently, computation can be completed at costs which are much lower than those required for performing computation with all combinations of documents. Further, documents can be appropriately on a per-document basis. Further, a result of arrangement becomes readable by utilization of a word as a label, thereby effecting a large practical effect.

(Second Embodiment)

A second embodiment of the invention will be described hereinbelow. The second embodiment is directed toward a market data analyzer.

Figure 8:
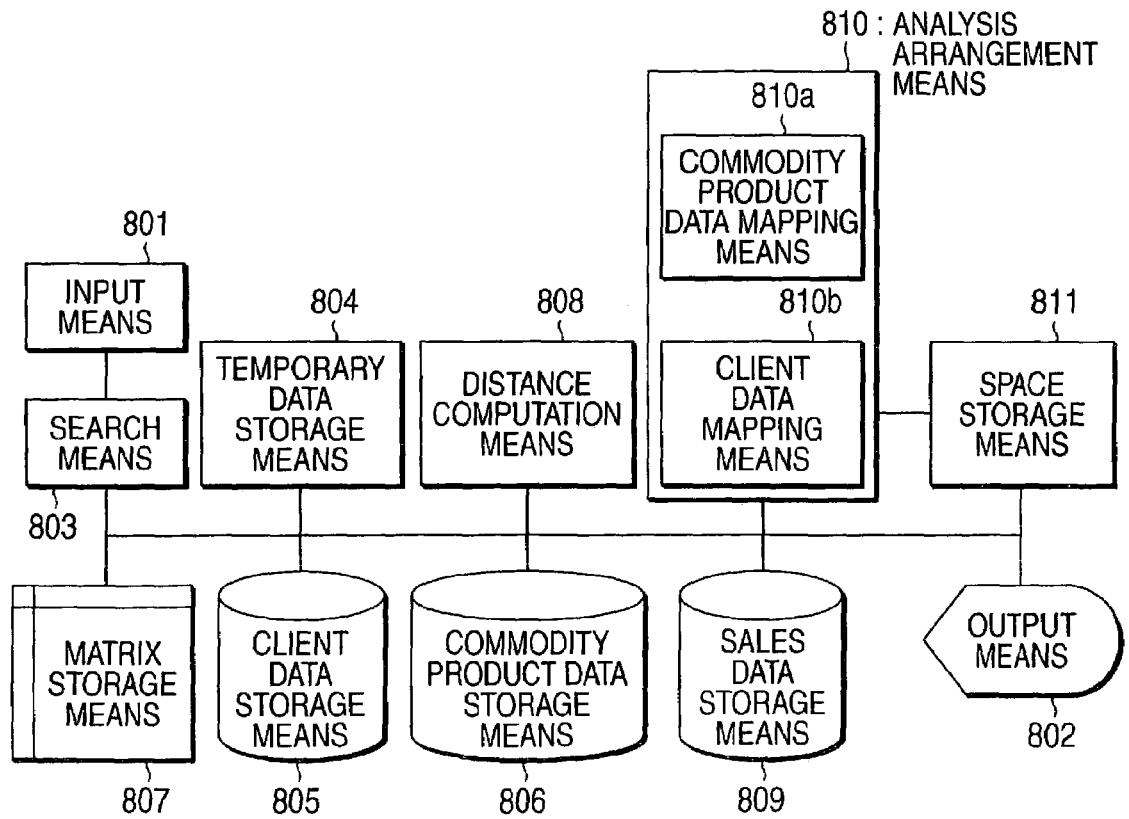
FIG. 8 is a block diagram showing a market data analyzer according to a second embodiment of the invention.

FIG. 8 is a block diagram showing the market data analyzer of the second embodiment.

As shown in FIG. 8, the analyzer comprises input means 801 for inputting search criteria; output means 802 for outputting a search result and a result of classification and arrangement; search means 803 for performing searching operation; temporary data storage means 804 for storing data pertaining to search results or the like; client data storage means 805 for reserving client data; commodity product data storage means 806 for storing information about commodity products; matrix storage means 807 for storing matrix data pertaining to commodity products and clients; distance computation means 808 for computing distances between commodity products, those between clients, and those between the commodity products and the clients through use of a matrix; sales data storage means 809 for storing sales data; analysis arrangement means 810 for arranging data in a space on the basis of distances among data; and space storage means 811 for storing information about the space.

Here, the analysis arrangement means 810 comprises commodity data mapping means 810*a* and client data mapping means 810*b*. In the appended claims the commodity data mapping means 810*a* is described as label mapping means, and the client data mapping means is described as data mapping means.

As shown in FIG. 9, clients and commodity products are recorded as rows and columns of a matrix in the matrix storage means 807. A matrix component (i, k) designates a total quantity of a commodity product "i" purchased by a client "k." Data pertaining to which clients purchased what commodity products are recorded in the sales data storage means 809.

FIG. 10 is a flowchart showing the outline of utilization and operation of the device.

(Step 1001) First, a user enters search criteria by way of the input means 801. Here, for instance, search criteria include "top 20 commodity products that have been sold within the past three months."

(Step 1002) The search means 803 searches data pertaining to commodity products and clients from the sales data storage means 809 and stores the thus-searched aggregate of commodity products and clients into the temporary data storage means 804.

Figure 11:
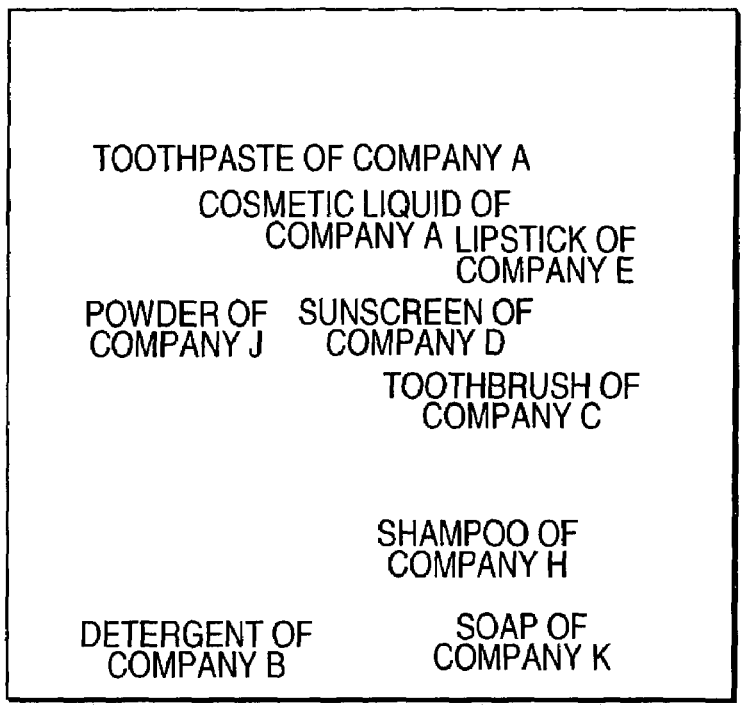
FIG. 11 is a schematic diagram showing an example result of arrangement of only commodity products according to the second embodiment.

(Step 1003) The distance computation means 808 computes distances between the searched commodity products on the basis of information stored in the matrix storage means 807. The commodity data mapping means 810*a* arranges the commodity products in a two-dimensional or three-dimensional space of the space storage means 811. The spring model or the SOM (self-organizing map), both being existing methods, is employed for arranging the commodity products in the space. The commodity products arranged in the space are expressed by trade names. FIG. 11 shows an example in which only commodity products are arranged in a two-dimensional space.

Figure 12:
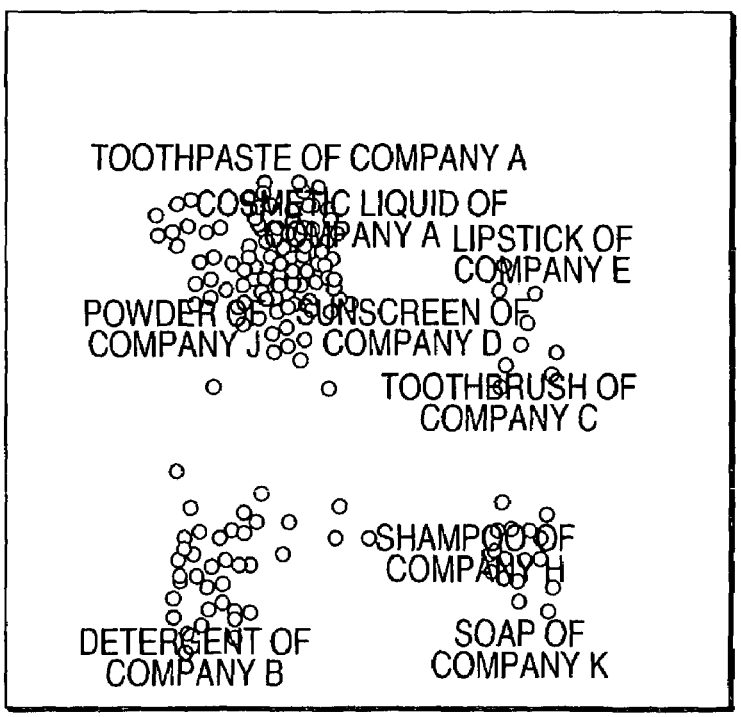
FIG. 12 is a schematic diagram showing an example of an output result of the second embodiment.

(Steps 1004) Next, the distance computation means 208 computes distances between the thus-arranged commodity products and the clients which have been searched in step 1002, on the basis of the information stored in the matrix storage means 807. The client data mapping means 810*b* arranges the clients in the two-dimensional or three-dimensional space of the space storage means 811. FIG. 12 shows an example arrangement of the clients in a two-dimensional space. In the drawing, circles denote the respective clients.

(Step 1005) Finally, a result of arrangement of the commodity products and the clients is output from the output means 802.

Figure 13:
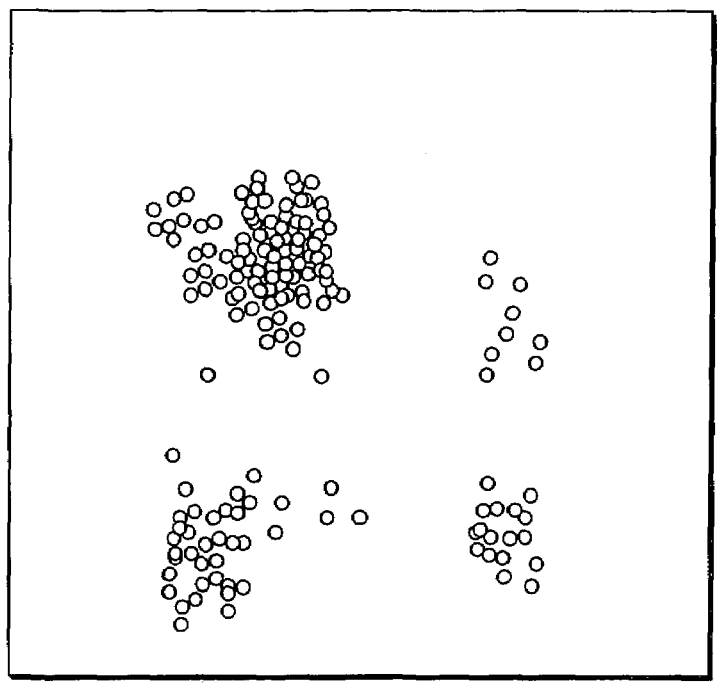
FIG. 13 is a conceptual rendering showing difficulty in finding data when trade names are not displayed in the second embodiment.

As mentioned above, the method of the invention enables analysis and arrangement of data in a space with a small amount of computation, by means of determining a first arrangement of data to be expressed in the form of a matrix through use of only an aggregation of data pertaining to rows or an aggregation of data pertaining to columns and by means of arranging remaining data through use of only data pertaining to an existing arrangement. Thus, analysis of data and arrangement of data in a space, which entail a small amount of computation, can be performed. Even in the field of marketing data, such as data pertaining to clients and commodity products, a large number of clients to be analyzed can be clustered by commodity products to be purchased. Even when only client data are classified by means of self-organizing clustering, the resultant data become difficult to understand, as shown in FIG. 13. Names of commodity products to be purchased can be displayed in a manner that is easy to understand, as shown in FIG. 12.

Figure 14:
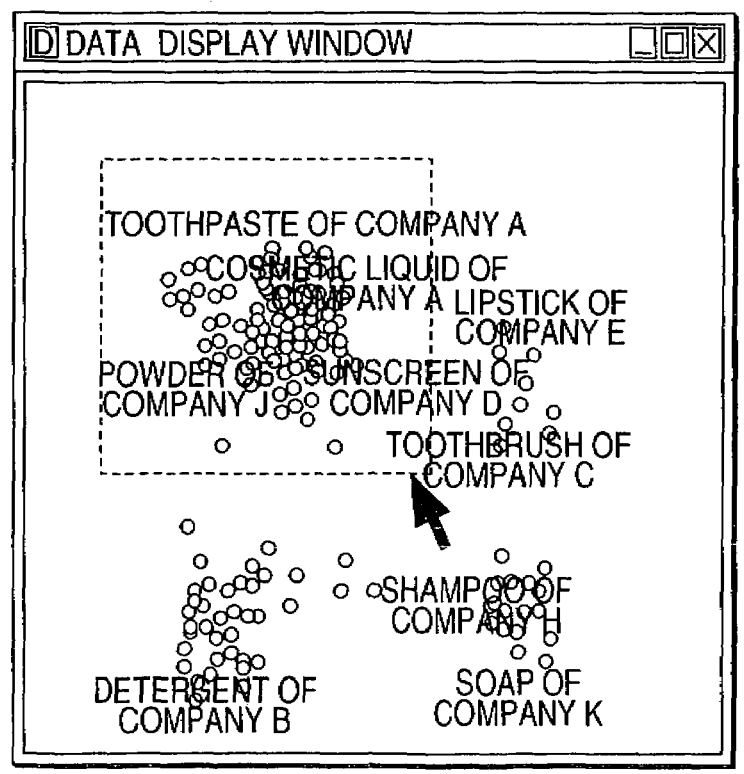
FIG. 14 is a schematic diagram showing operation of a GUI pertaining to an output result according to the second embodiment.

As a matter of course, in the field of marketing analysis, a portion of displayed data is extracted by means of selecting a portion of a data display window shown in FIG. 14, the portion corresponding to the portion of the displayed data, through use of a mouse, and the thus-extracted data can be subjected to more detailed analysis.

As has been described, in the embodiment, only commodity products are arranged in a space, and client data are arranged one by one on the basis of only distances to the arranged commodity products. Consequently, computation can be completed with expense of costs much lower than those required to compute combinations of all clients. Further, clients can be arranged appropriately on a per-client basis. As a result of commodity products being utilized as labels, a result of arrangement becomes easy to understand, thus yielding a large practical effect.

As has been described, according to the invention, data of a smaller volume are arranged in a space in advance in connection with a set of data which can be expressed in the form of a matrix, such as words and documents, or commodity products and clients. Data of a larger volume are arranged in a space through use of that arrangement. An appropriate arrangement can be realized with a smaller volume of computation. The data of smaller volume or the data of larger volume can be used as labels, by means of arranging both the data of larger volume and the data of smaller volume. Hence, a result of arrangement of data that is easily understandable for the user can be obtained. When data of a larger volume are arranged, the data are compared with the labels. Hence, influence of labels provided at distant positions as well as that of labels provided at close positions are taken into consideration. Consequently, faster and more accurate analysis and classification of data become feasible. A resultant practical effect is very large.

What is claimed is:

1. An information analysis display device comprising analysis arrangement means including:

label mapping means for taking a set A having a smaller number of data from among two sets of data stored in a storage means, said data to be used as labels showing attributes of a data distribution and for mapping respective data objects A, included in the set A, in a space of two or more dimensions while relative distances between the data objects of the data objects A are maintained; and data mapping means for taking a set having a larger number of data as a set B to be subjected to data analysis and for mapping respective data objects B, included in the set B, in the space by utilizing the relative distances between the data objects A and while relative distances between the data objects of the respective data objects A and B are maintained.

2. The information analysis display device according to claim 1, wherein the data mapping means map the data objects B with fixing arrangement and position of the data objects A obtained as a result of mapping operation performed by the label mapping means.

3. The information analysis display device according to claim 1 or 2, further comprising: output means for visually displaying arrangement and positions of at least the data objects A or B in the space in which the data objects are arranged by the analysis arrangement means.

4. The information analysis display device according to claim 1 or 2, wherein, when the data objects A are taken as word data, the data objects B are taken as document data, whereas when the data objects B are taken as word data, the data objects A are taken as document data.

5. The information analysis display device according to claim 3, wherein, when the data objects A are taken as word data, the data objects B are taken as document data, whereas when the data objects B are taken as word data, the data objects A are taken as document data.

6. The information analysis display according to claim 1 or 2, wherein when the data objects A are taken as commodity product data, the data objects B are taken as client data, whereas when the data objects B are taken as commodity product data, the data objects A are taken as client data.

7. The information analysis display according to claim 3, wherein when the data objects A are taken as commodity product data, the data objects B are taken as client data, whereas when the data objects B are taken as commodity product data, the data objects A are taken as client data.

8. The information analysis display device according to claim 3, wherein the output means highlights the data objects A having a grater number of the data objects B than a threshold value, wherein the data objects B are arranged at locations closer than a predetermined distance.

9. The information analysis display device according to claim 3, wherein the output means highlights the data objects A having a smaller number of the data objects B than a threshold value, wherein the data objects B are arranged at locations closer than a predetermined distance.

10. An information analysis display device comprising:
matrix storage means for taking, as data objects A, data included in one of two sets of data and used as labels showing attributes of a data distribution, and for taking, as data objects B, data included in a remaining set of data to be analyzed, and also for taking the data objects A as rows and the data objects B as columns, and for storing a matrix formed by taking, as components, values showing a relationship between the data objects A and B;
distance computation means for computing distances between data objects A and distances between data objects A and B, all the objects being stored in the matrix storage means;
space storage means for storing a space in which the data objects are to be arranged;
output means for visually outputting information about the space obtained as a result of the arrangement; and
analysis arrangement means for arranging the data objects in the space;
wherein the analysis arrangement means includes label mapping means for arranging the data objects A in the space by utilizing only the distances between the data objects A computed by the distance computation means, and also including data mapping means for determining the arrangement of the data objects B and arranging the data objects B in the space on the basis of the arrangement of the data objects A by utilizing the distances between the data objects A and B computed by the distance computation means, and wherein the output means displays at least either the data objects A or B.

11. The information analysis display device according to claim 10, wherein when the data objects A are taken as word data, the data objects B are taken as document data, whereas when the data objects B are taken as word data, the data objects A are taken as document data, and a value representing a relationship between the data objects A and B is taken as a frequency of appearance of a word in a document.

12. The information analysis display device according to claim 10, wherein when the data objects A are taken as commodity product data, the data objects B are taken as client data, whereas when the data objects B are taken as commodity product data, the data objects A are taken as client data and a value representing a relationship between the data objects A and B is taken as a frequency of purchase of a commodity product by a client.

13. The information analysis display device according to claim 10, wherein the output means highlights the data objects A having a grater number of the data objects B than a threshold value, wherein the data objects B are arranged at locations closer than a predetermined distance.

14. The information analysis display device according to claim 10, wherein the output means highlights the data objects A having a smaller number of the data objects B than a threshold value, wherein the data objects B are arranged at locations closer than a predetermined distance.

15. An information analysis display program to be carried out by a computer for causing the computer to display analysis of data, said program comprising:
a label mapping step of taking a set A having a smaller number of data from among two sets of data stored in storage means to be used as labels showing attributes of a data distribution, and of arranging data objects A in a space of two or more dimensions in relation to the set A while relative distances between data objects of the data objects A are maintained, wherein the data objects correspond to the data included in the set A;
a data mapping step of taking a set B having a larger number of data to be subjected to data analysis and arranging data objects B by utilizing the relative distances between the data objects A and while relative distances between the data objects A and B are maintained, wherein the data objects B correspond to data of the set B; and
a step of visually displaying the arrangement of at least one of the data objects A and B mapped in the space.

16. An information analysis display program for causing a computer to perform functions of the following means in order to display analysis of data:
matrix storage means for taking data, included in a data set A to be used as labels showing attributes of a data distribution, from among two sets of data, and for taking data included in a data set B to be subjected to data analysis, and also for taking the data objects A as rows and the data objects B as columns, and further for storing a matrix including, as a component, a value representing a relationship between the data objects A and B;
distance computation means for computing distances between data objects A and distances between data objects A and B, all data objects being stored in the matrix storage means;
space storage means for storing a space in which the data objects A and B are to be arranged;
label mapping means for mapping the data objects A in the space by utilizing only the distances between the data objects A computed by the distance computation means;
data mapping means for mapping the data objects B in the space by determining the arrangement of the data objects B through utilization of the distances between the data objects A and B computed by the distance computation means on the basis of the arrangement; and output means for displaying at least one of the mapping results of the data objects A and B.

17. An information analysis display method to be used for analyzing two sets of data and displaying results of the analysis, the method comprising:

a label mapping step for taking a set A having a smaller number of data from among two sets of data stored in storage means, and using data objects A data objects corresponding to data included in the set A as labels showing attributes of a data distribution, and arranging the data objects A in a space of two or more dimensions while relative distances between data objects A are maintained;

a data mapping step for taking a set B having a larger number of data to be subjected to data analysis and arranging data objects B corresponding to data included in the set B in the space by utilizing the relative distances between the data objects A and while relative distances between the data objects A and B are maintained; and a step for visually displaying the arrangement and positions of at least one of the data objects A and B mapped in the space.

18. An information analysis display method to be used for analyzing two sets of data and displaying results of analysis, the method comprising:

a matrix storage step of taking data included in one of two sets of data as data objects A, taking data included in the remaining set of data as data objects B, taking the data objects A as rows, taking the data objects B as columns, and storing a matrix including, as a component, a value showing a relationship between the data objects A and B;

a distance computation step for computing distances between the data objects A and distances between the data objects A and B, all objects being stored in the matrix storage step;

a space storage step for storing a space into which the data objects A and B are to be mapped;

a label mapping step for mapping the data objects A in a space by utilizing the distances between data objects A computed in the distance computation step;

a data mapping step of determining an arrangement of the data objects B on the basis of a result of the label mapping of the data objects A by utilizing the distances between the data objects A and B computed in the distance computation step, thereby mapping the data objects B in the space; and an output step of displaying the mapping result of at least one of the data objects A and B.

* * * * *